United States Patent [19]

Moriya

[11] Patent Number: 5,209,640
[45] Date of Patent: May 11, 1993

[54] PITCH CONTROL APPARATUS FOR VARIABLE PITCH PROPELLER

[75] Inventor: Yoshihito Moriya, Takahama, Japan

[73] Assignee: Toyota Jidosha Kabushiki Kaisha, Toyota, Japan

[21] Appl. No.: 635,360

[22] Filed: Dec. 28, 1990

[30] Foreign Application Priority Data

| Dec. 30, 1989 | [JP] | Japan | 1-343578 |
| Apr. 25, 1990 | [JP] | Japan | 2-109275 |
| May 17, 1990 | [JP] | Japan | 2-127795 |
| May 17, 1990 | [JP] | Japan | 2-127796 |

[51] Int. Cl.$^5$ .................................... B64C 11/30
[52] U.S. Cl. .................................... 416/27; 416/28; 416/29; 416/30; 416/35; 416/36; 416/37; 416/44; 364/431.01
[58] Field of Search ........... 416/25, 27, 28, 29, 416/30, 35, 36, 37, 44; 364/431.01

[56] References Cited

U.S. PATENT DOCUMENTS

| 2,619,183 | 11/1952 | Chillson et al. | 416/35 |
| 2,640,550 | 6/1953 | Knapp et al. | 416/35 |
| 2,667,228 | 1/1954 | Wood et al. | 416/36 |
| 3,589,830 | 6/1971 | Mogren et al. | 416/35 |
| 4,958,289 | 9/1990 | Sum et al. | 416/27 |
| 5,029,091 | 7/1991 | Schneider et al. | 416/25 |
| 5,061,212 | 10/1991 | Morgenthaler et al. | 416/25 |

FOREIGN PATENT DOCUMENTS 75792  6/1977  Japan ................................ 416/35

Primary Examiner—Edward K. Look
Assistant Examiner—James A. Larson
Attorney, Agent, or Firm—Kenyon & Kenyon

[57] ABSTRACT

A pitch control apparatus for a variable pitch propeller for drive connection to an aircraft engine, wherein an optimum rotation number of the engine is calculated in relation to a flight speed of the aircraft, an opening degree of the engine throttle and the density of atmospheric air in flight of the aircraft to maximize a thrust force acting on the aircraft, and wherein a pitch angle of the propeller blade is controlled in such a manner that the rotation number of the engine becomes substantially equal to the optimum rotation number.

5 Claims, 24 Drawing Sheets

PITCH CONTROL APPARATUS FOR VARIABLE PITCH PROPELLER

BACKGROUND OF THE INVENTION

1. Field of the Invention

The present invention relates to a propeller system for installation in aircrafts, and more particularly to a pitch control apparatus for a variable pitch propeller.

2. Description of the Prior Art

In Japanese Patent Early Publication No. 60-76499, there has been proposed a pitch control apparatus for a variable pitch propeller wherein the pitch angle and rotation speed of the propeller are controlled on a basis of data indicative of Mach number, flight height, atmospheric temperature, output power of the aircraft engine in flight to maximize the operation efficiency of the propeller. In the pitch control apparatus, only the performance data of the propeller is used to enhance the operation efficiency of the propeller without any consideration to the engine characteristic. Since a thrust force acting on the aircraft is represented by a product of the engine output power and the operation efficiency of the propeller, a maximum thrust force would not be obtained even if only the operation efficiency of the propeller in flight was maximized under control of the opening degree of the engine throttle.

SUMMARY OF THE INVENTION

It is, therefore, a primary object of the present invention to provide a pitch control apparatus for a variable pitch propeller wherein the pitch angle of the propeller is controlled on a basis of the characteristics of the engine and propeller for maximizing a thrust force acting on the aircraft under an opening degree of the engine throttle adjusted by the pilot.

A secondary object of the present invention is to provide a pitch control apparatus for a variable pitch propeller wherein the pitch angle of the propeller is controlled in such a manner as to maximize a product of the propeller efficiency and the operational efficiency of the engine for most economical fuel consumption in operation of the engine.

According to the present invention, the primary object is attained by providing a pitch control apparatus for a variable pitch propeller for drive connection to an aircraft engine, comprising a flight speed sensor for detecting a flight speed of the aircraft and for producing a first electric signal indicative of the detected flight speed, a throttle sensor for detecting an opening degree of the engine throttle and for producing a second electric signal indicative of the detected opening degree of the engine throttle, an engine rotation sensor for detecting a rotation number of the engine and for producing a third electric signal indicative of the detected rotation number of the engine, means for detecting the density of atmospheric air in flight of the aircraft, means responsive to the first and second electric signals for calculating an optimum rotation number of the engine in relation to the flight speed, the opening degree of the engine throttle and the density of atmospheric air for maximizing a thrust force acting on the aircraft, and means responsive to the third electric signal for controlling a pitch angle of the propeller blade in such a manner that the rotation number of the engine becomes substantially equal to the calculated optimum rotation number.

BRIEF DESCRIPTION OF THE DRAWINGS

Other objects, features and advantages of the present invention will be more readily appreciated from the following detailed description of preferred embodiments thereof when taken together with the accompanying drawings, in which:

FIG. 10 is a two dimensional map for calculating a reference value in relation to a flight speed of the aircraft and the density of atmospheric air;

FIG. 11 is a two dimensional map for calculating an optimum rotation number of the engine in relation to the reference value and an opening degree of the engine throttle;

DESCRIPTION OF THE PREFERRED EMBODIMENTS

Figure 1:
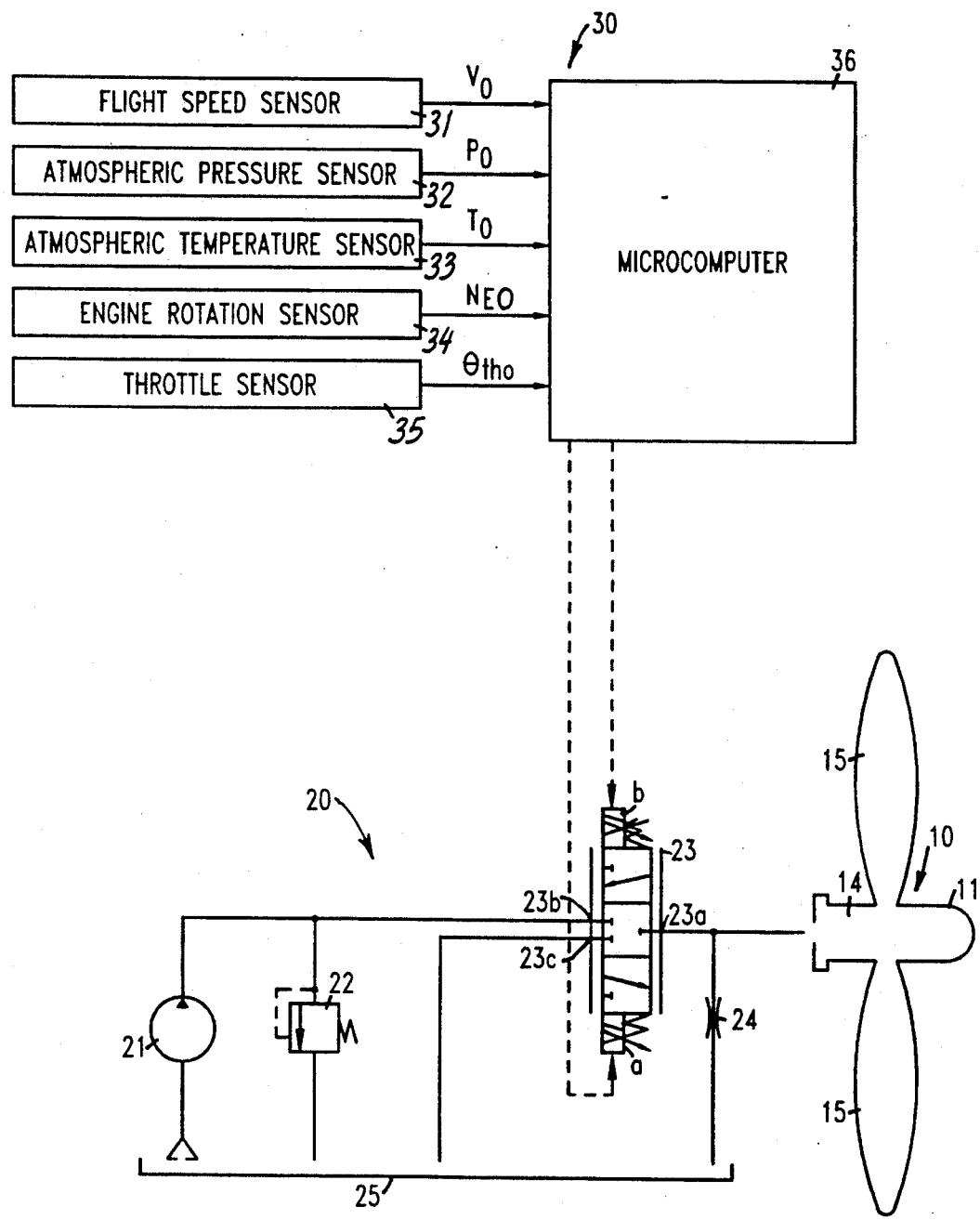
FIG. 1 is a schematic illustration of a pitch control apparatus for a variable pitch propeller in accordance with the present invention.
Figure 2:
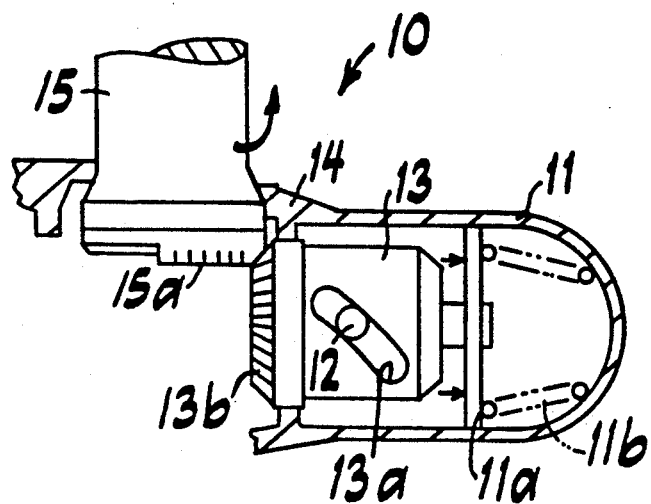
FIG. 2 is a sectional view of a variable pitch mechanism of the propeller.

In FIG. 1 of the drawings, there is schematically illustrated a pitch control control apparatus for a variable pitch propeller which comprises an electronic control apparatus 30 associated with a hydraulic control circuit 20 for a variable pitch mechanism 10. As shown in FIG. 2, the variable pitch mechanism 10 of the propeller includes a hub housing 14 arranged to be driven by an aircraft engine (not shown) and being integrally formed with a hydraulic cylinder 11, a reciprocating piston 11a disposed within the hydraulic cylinder 11 and loaded by a return spring 11b attached thereto, a follower pin 12 mounted on a rod portion of piston 11a for axial movement therewith, a hub member 13 rotatably mounted within the hub housing 14 and retained in place in an axial direction, the hub member 13 being formed with a cam slot 13a in engagement with the follower pin 12, a bevel gear 13b integrally provided on one end of hub member 13, a bevel gear 15a rotatably mounted within the housing 14 and retained in place in an axial direction, the bevel gear 15a being integrally formed with a blade butt 15 of the propeller and meshed with the bevel gear 13b. Assuming that the hydraulic cylinder 11 has been supplied with hydraulic fluid under pressure from the hydraulic control circuit 20, the piston 11 is moved rightward against the load of return spring 11b to rotate the blade butt 15 in a direction shown by an arrow in FIG. 2. As a result, the pitch angle of the propeller blade is varied to be a coarse pitch angle.

The hydraulic control circuit 20 includes a fluid pump 21 arranged to be driven by the aircraft engine, a relief valve 22 arranged to define a maximum pressure of hydraulic fluid discharged from pump 21, a single electromagnetic flow quantity control valve 23, and a throttle 24. The electromagnetic flow quantity control valve 23 is operated under control of the electronic control apparatus 30 to control the quantity of hydraulic fluid under pressure supplied into the hydraulic cylinder 11. The flow quantity control valve 23 is provided with solenoids a and b to be selectively energized by an electric control current applied thereto from the electronic control apparatus 30. The flow quantity control valve 23 is designed to be returned to and retained in a neutral position if the electronic control apparatus 30 becomes inoperative.

In a condition where the control valve 23 is retained in the neutral position, an outlet port 23a in connection to the hydraulic cylinder 11 is disconnected from inlet ports 23b and 23c respectively in connection to the delivery port of pump 21 and to a fluid reservoir 25. When the solenoid a is energized, the control valve 23 is displaced to provide a connection between ports 23a and 23b for effecting the supply of hydraulic fluid under pressure into the hydraulic cylinder 11 from pump 21. When the solenoid b is energized, the control pump 23 is displaced to provide a connection between ports 23a and 23c for discharging the hydraulic fluid from the hydraulic cylinder 11 into the fluid reservoir 25. The throttle 24 is arranged to allow a small quantity of hydraulic fluid under pressure flowing therethrough into the fluid reservoir 25. If the electronic control apparatus 30 is damaged or the leading wires of solenoids a, b are disconnected during operation of the pitch control apparatus, the control valve 23 will be returned to and retained in the neutral position to disconnect the outlet port 23a from the inlet ports 23b and 23c. Thus, the pressure in hydraulic cylinder 11 is maintained to avoid a sudden change of the pitch angle of the propeller blade. In such a condition, the throttle 24 causes the hydraulic fluid from cylinder 11 to gradually discharge therethrough into the fluid reservoir 25. As a result, the piston 11a of cylinder 11 is moved leftward by the load of return spring 11b to vary the pitch angle of the propeller blade to a fine pitch angle for fail safe.

The electronic control apparatus 30 includes a flight speed sensor 31 for detecting a flight speed V of the aircraft, an atmospheric pressure sensor 32 for detecting the atmospheric pressure P in flight of the aircraft, an atmospheric temperature sensor 33 for detecting the atmospheric temperature T in flight of the aircraft, an engine rotation sensor 34 for detecting a rotation number $N_E$ of the aircraft engine, a throttle sensor 35 for detecting an opening degree $\theta$th of the engine throttle, and a microcomputer 36 connected to the sensors 31–35.

Figure 3A:
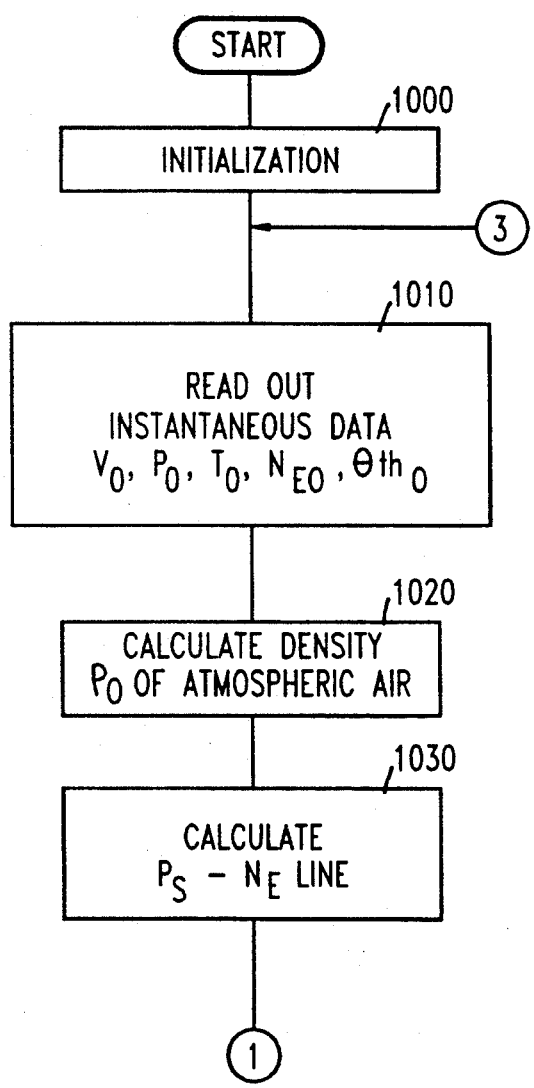
FIGS. 3(a) to 3(c) illustrate a flow chart of a main routine to be processed by a microcomputer shown in FIG. 1.
Figure 3B:
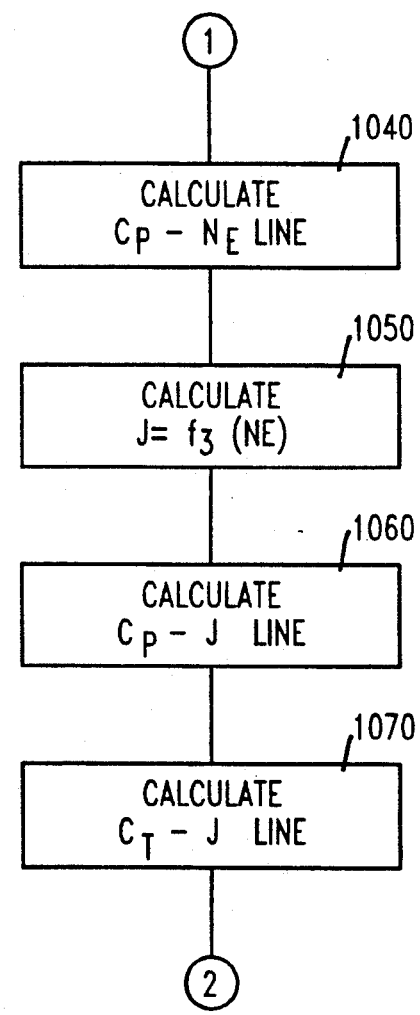
Figure 3C:
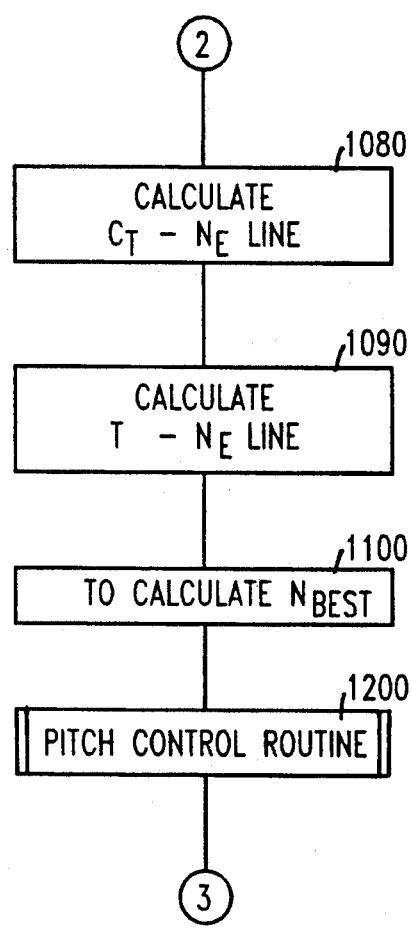
Figure 4:
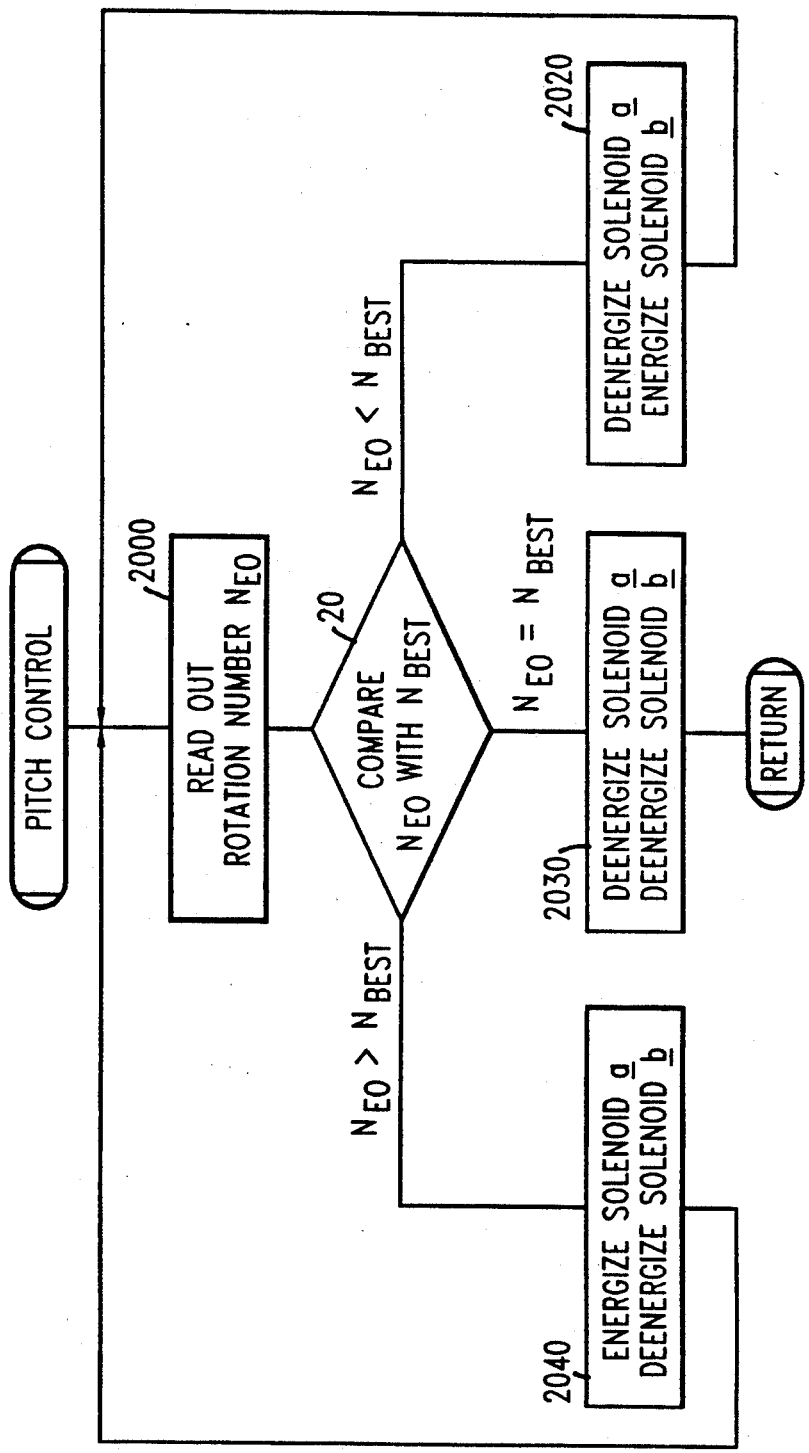
FIG. 4 illustrates a flow chart of a pitch control routine to be processed by the computer.

The microcomputer 36 comprises an interface arranged to be applied with input signals from sensors 31—35, a read-only memory or ROM arranged to store a main routine shown in FIGS. 3(a) to 3(c), a pitch control routine shown in FIG. 4 and maps for processing programs of the main and pitch control routines, a central processing unit or CPU for execution of the programs, and a random access memory or RAM arranged to temporarily memorize variables for execution of the programs. The maps are stored in the ROM in the form of two kinds of the two dimensional maps shown in FIGS. 5 and 6, respectively representing an output power $P_s$ of the engine in relation to the rotation number $N_E$ of the engine and the opening degree $\theta$th of the engine throttle and a thrust coefficient in relation to an advance ratio J and a power coefficient Cp. The thrust coefficient $C_T$ and the engine output power $P_s$ are memorized as data theoretically confirmed in consideration with the engine characteristic.

The flight speed sensor 31 detects an instantaneous flight speed V of the aircraft to produce a first electric signal indicative of the detected flight speed $V_0$, the atmospheric pressure sensor 32 detects the instantaneous atmospheric pressure P around the aircraft in flight to produce a second electric signal indicative of the detected atmospheric pressure $P_0$, and the atmospheric temperature sensor 33 detects the instantaneous atmospheric temperature T around the aircraft in flight to produce a third electric signal indicative of the detected atmospheric temperature $T_0$. The engine rotation sensor 34 detects an instantaneous rotation number $N_E$ of the aircraft engine in drive connection to the propeller to produce a fourth electric signal indicative of the detected rotation number $N_{E0}$. In a practical embodiment, the engine rotation sensor 34 is designed to optically or electromagnetically measure a rotational number of a crankshaft of the engine per a unit of time. The throttle sensor 35 is in the form of a potentiometer arranged to detect an opening degree $\theta$th of the engine throttle for producing a fifth electric signal indicative of the detected opening degree $\theta$th$_0$. The electric signals from sensors 31-35 are converted into corresponding digital signals at the interface of computer 36.

Hereinafter, the operation of the pitch control apparatus will be described in detail with reference to the flow charts shown in FIGS. 3(a) to 3(c). Assuming that the aircraft engine has been started, the computer 36 is activated to initiate execution of the main routine shown by the flow chart in FIGS. 3(a) to 3(c). At step 1000 of the main routine shown in FIG. 3(a), the CPU of computer 36 initializes variables for execution of the main routine and causes the program to proceed to step 1010. At step 1010 of the program, the CPU of computer 36 is applied with the electric signals from sensors 31-35 through the interface to read out therefrom the flight speed $V_0$ of the aircraft, the atmospheric pressure $P_0$, the atmospheric temperature $T_0$, the rotation number $N_{E0}$ of the aircraft engine and the opening degree $\theta th_0$ of the engine throttle and to temporarily store the data in the RAM of computer 36. At the following step 1020 of the program, the CPU of computer 36 calculates the density $\rho_0$ of atmospheric air based on the atmospheric pressure $P_0$ and temperature $T_0$. In this embodiment, the calculated density $\rho_0$ of atmospheric air is used to calculate an optimum rotation number $N_{BEST}$ the engine in relation to the detected flight speed $V_0$ and opening degree $\theta th_0$ of the engine throttle for maximizing a thrust force acting on the aircraft.

Figure 5:
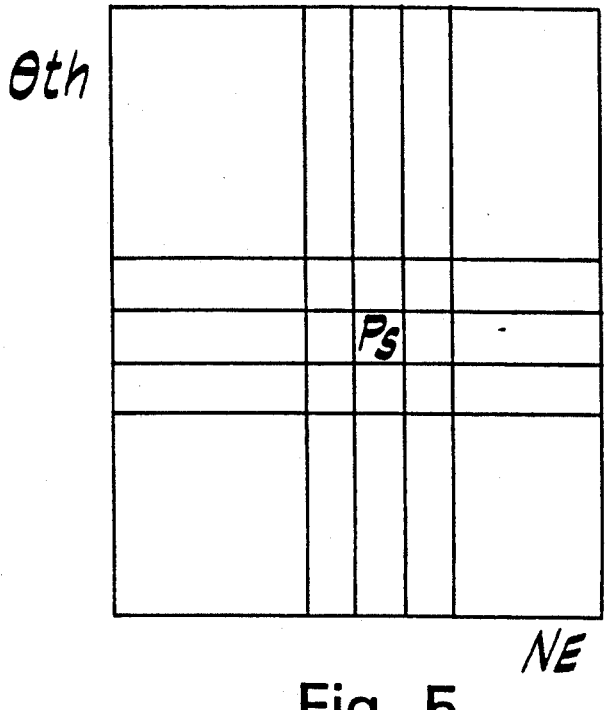
FIG. 5 is a two dimensional map for calculating output power of the aircraft engine in relation to an opening degree of the engine throttle and a rotation number of the engine.
Figure 6:
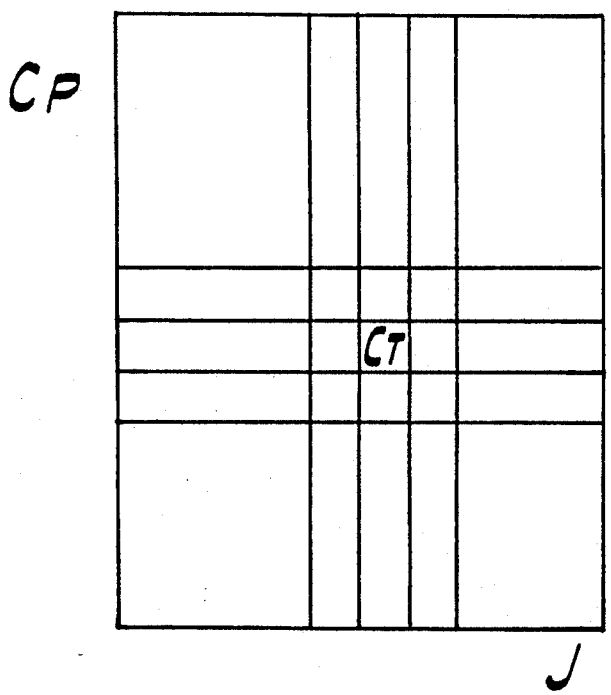
FIG. 6 is a two dimensional may for calculating a thrust coefficient in relation to an advance ratio and a power coefficient.

When the program proceeds to step 1030, the CPU of computer 36 reads out the map of FIG. 5 to calculate a $P_s$-$N_E$ line indicative of a relationship between the rotation number $N_E$ of the engine and the output power $P_s$ of the engine at the throttle opening degree $\theta th_0$. In this instance, the output power $P_s$ is calculated by the following equation.

$$P_s = \rho_0 \cdot Cp \cdot Np^3 \cdot D^5 \qquad (1)$$

where the character Cp is a power coefficient, the character Np is a rotation number of the propeller and the character D is the diameter of the propeller. The rotation number Np of the propeller is calculated by the following equation.

$$Np = k \cdot N_E \qquad (2)$$

where the character k is a coefficient. Thus, the power coefficient Cp is calculated by the following equation.

$$Cp = f_1(P_s, N_E) \qquad (3)$$

At step 1040 of the program shown in FIG. 3(b), the CPU of computer 36 calculates a Cp-$N_E$ line indicative of a relationship between the power coefficient Cp and the rotation number $N_E$ of the engine on a basis of the $P_s$-$N_E$ line An advance ratio J is calculated by the following equation.

$$J = V/Np \cdot D \qquad (4)$$

Since the rotation number Np of the propeller is calculated by the equation (2), the CPU of computer 36 calculates at step 1050 a relationship between the advance ratio J and the rotation number $N_E$ of the engine as is described below.

$$J = f_3(N_E) \qquad (5)$$

At step 1060 of the program, the CPU of computer 36 substitutes the Cp-$N_E$ line into the relationship between the advance rate J and the rotation number $N_E$ of the engine to calculate a Cp-J line indicative of a relationship between the power coefficient Cp and the advance ratio J. At step 1070 of the program, the CPU of computer 36 reads out the map of FIG. 6 to calculate a $C_T$-J line indicative of a relationship between the thrust coefficient $C_T$ and the advance ratio J. When the program proceeds to step 1080 shown in FIG. 3(c), the CPU of computer 36 substitutes the $C_T$-J line into the equation (5) to calculate a $C_T$-$N_E$ line indicative of a relationship between the thrust coefficient and the rotation number of the engine. In this instance, a thrust force T is calculated by the following equation.

$$T = \rho_0 \cdot CT \cdot Np^2 \cdot D^4 \qquad (6)$$

At step 1090 of the program, the CPU of computer 36 substitutes the equation (2) and the $C_T$-$N_e$ line into the equation (6) to calculate a T-$N_E$ line indicative of a relationship between the thrust force and the rotation number of the engine. In this instance, an actual thrust force acting on the aircraft can be calculated in accordance with change of the rotation number of the engine in flight. Thus, at step 1100 of the program, the CPU of computer 36 calculates an optimum rotational number $N_{BEST}$ of the engine for maximizing the actual thrust force acting on the aircraft.

After calculation of the optimum rotation number $N_{BEST}$ of the engine, the CPU of computer causes the program at step 1200 to proceed to the pitch control routine shown by the flow chart in FIG. 4. At step 2000 of the pitch control routine, the CPU of computer 36 reads out an instantaneous rotation number $N_{E0}$ of the aircraft engine detected by sensor 34 and causes the program to proceed to step 2010. At step 2010 of the program, the CPU of computer 36 compares the instantaneous rotation number $N_{E0}$ of the engine with the calculated optimum rotation number $N_{BEST}$. When the instantaneous rotation number $N_{E0}$ is less than the calculated optimum rotation number $N_{BEST}$, the program proceeds to step 2020 where the CPU of computer 36 produces a control current therefrom for energization of the solenoid b of flow quantity control valve 23. In response to energization of the solenoid b, the control valve 23 is displaced to interrupt the hydraulic fluid under pressure supplied from pump 21 at its inlet port 23b and to permit the hydraulic fluid discharged from cylinder 11 into the fluid reservoir 25 through its ports 23a and 23c. As a result, the piston 11a is moved leftward by the load of return spring 11b to rotate the blade butt 15 in the opposite direction to the arrow shown in FIG. 2. Thus, the pitch angle of the propeller blade is varied to be a fine pitch angle, and the power absorbed by the propeller blade is decreased to increase the rotation number of the engine. While the rotation number $NE_0$ of the engine is still less than the optimum rotation number $N_{BEST}$, the CPU of computer 36 will repeat the processing at step 2000, 2010 and 2020 to increase the rotation number of the engine.

When the rotation number of the engine becomes substantially equal to the optimum rotation number $N_{BEST}$, the CPU of computer 36 causes the program at step 2010 to proceed to step 2030. At step 2030, the CPU of computer 36 does not produce any control current to maintain the solenoids a and b of control valve 23 in their deenergized conditions. Thus, the control valve 23 is returned to and retained in the neutral position to disconnect the outlet port 23a from the inlet ports 23b and 23c. In such a condition, the pressure in hydraulic cylinder 11 is maintained to avoid a sudden change of the pitch angle of the propeller blade, and the throttle 24 causes the hydraulic fluid from cylinder 11 to gradually discharge therethrough into the fluid reservoir 25. As a result, the piston 11a of cylinder 11 is gradually moved leftward by the load of return spring 11b to vary the pitch angle of the propeller blade to a fine pitch angle for fail-safe. After processing at step 2030, the CPU of computer 36 returns the program to step 1010 of the main routine to read out instantaneous data under various flight conditions of the aircraft and to repeat execution at step 1020 to 1100 as described above.

In a condition where the instantaneous rotation number $NE_0$ of the engine is more than the optimum rotation number $N_{BEST}$ at step 2010 of the pitch control routine, the CPU of computer 36 causes the program to proceed to step 2040. At step 2040, the CPU of computer 36 produces a control current therefrom for energization of the solenoid a of control valve 23. In response to energization of the solenoid a, the control valve 23 is displaced to supply the hydraulic fluid under pressure from pump 21 into the hydraulic cylinder 11 therethrough. Thus, the piston 11a of cylinder 11 is moved rightward against the load of return spring 11b to rotate the blade butt 15 in the direction shown by the arrow in FIG. 2. As a result, the pitch angle of the propeller blade is varied to be a coarse pitch angle, and the power absorbed by the propeller is increased to decrease the rotation number of the engine. When the instantaneous rotation number $NE_0$ of the engine becomes substantially equal to the optimum rotation number $N_{BEST}$ during repetitive execution of the pitch control routine, the CPU of computer 36 causes the program at step 2010 to proceed to step 2030. After execution at step 2030, the CPU of computer 36 returns the program to step 1010 of the main routine to read out instantaneous data under various flight conditions of the aircraft and to repeat execution at step 1020 to 1100 as described above.

From the above description, it will be understood that during execution of the pitch control routine the control valve 23 is controlled by the control current applied thereto from the computer 36 to vary the pitch angle of the propeller blade 15 in such a manner that the instantaneous rotation number $N_{E0}$ of the engine becomes substantially equal to the optimum rotation number $N_{BEST}$. Such control of the control valve 23 is effective to maximize the thrust force acting on the aircraft under various flight conditions without any control of the engine throttle. Thus, the control system of the variable pitch propeller can be simplified, and a throttle lever operated by the pilot can be mechanically connected to the engine throttle to enhance reliability of the pitch control apparatus.

Although in the above embodiment the atmospheric pressure and temperature are detected by sensors 32 and 33 to calculate the density of atmospheric air, other detecting means may be adapted to detect the density of atmospheric air. Alternatively, the calculation of the optimum rotation number $N_{BEST}$ may be carried out by execution of a modification of the main routine shown by a flow chart in FIG. 7. In this modification, the ROM of computer 36 is arranged to store a three dimensional map shown in FIG. 8. The three dimensional map is designed to calculate an optimum rotation number $N_{BEST}$ for maximizing a thrust force acting on the aircraft on a basis of a relationship among the flight speed V, the density $\rho$ of atmospheric air and the opening degree $\theta$th of the engine throttle.

Figure 7:
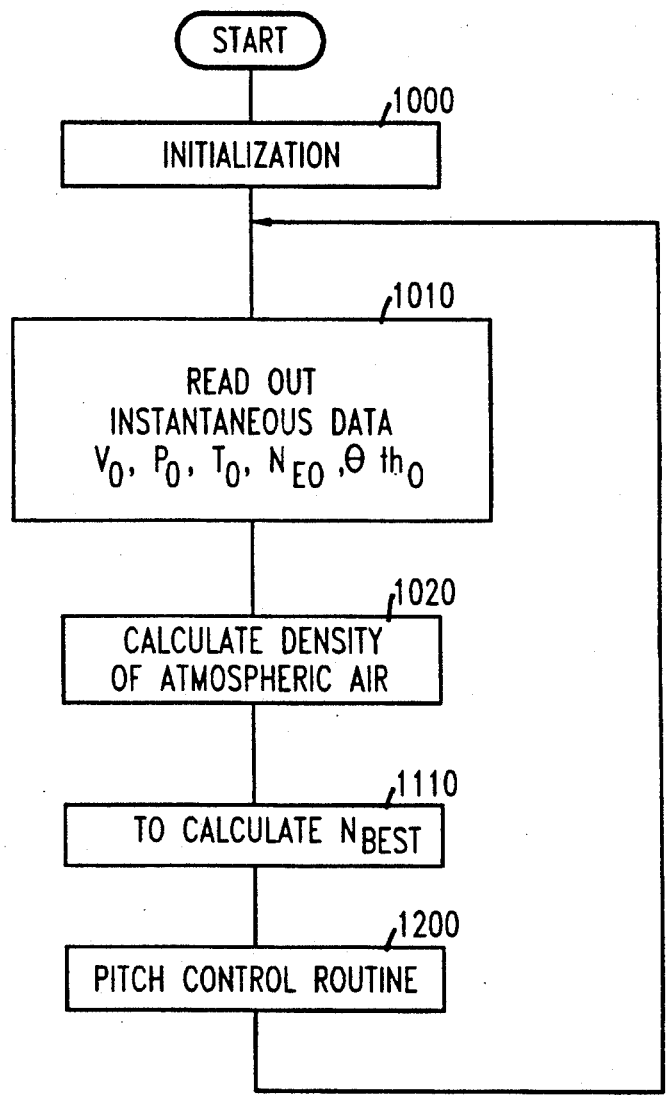
FIG. 7 is a flow chart illustrating a modification of the main routine shown in FIGS. 3(a) to 3(c)

Assuming that the CPU of computer 36 has been activated to initiate the execution of the modified main routine shown in FIG. 7, the instantaneous data detected by sensors 31-35 are read out at step 1010 after initialization of the variables at step 1000. Subsequently, the density $\rho_0$ of atmospheric air is calculated on a basis of the instantaneous data at step 1020. At the following step 1110, the CPU of computer 36 reads out the three dimensional map to calculate an optimum rotation number $N_{BEST}$ in relation to the flight speed $V_0$, the opening degree $\theta$th of the engine throttle and the calculated density $\rho$ of atmospheric air. Thereafter, the CPU of computer 36 executes the pitch control routine of FIG. 4 at step 1200 to render the instantaneous rotation number of the engine substantially equal to the optimum rotation number $N_{BEST}$. With the modified main routine, the optimum rotation number for maximizing the thrust force acting on the aircraft can be calculated without such complicated calculation as described above. As a result, the processing time of the program can be shortened, and accumulation of errors in the calculation can be avoided.

Figure 9:
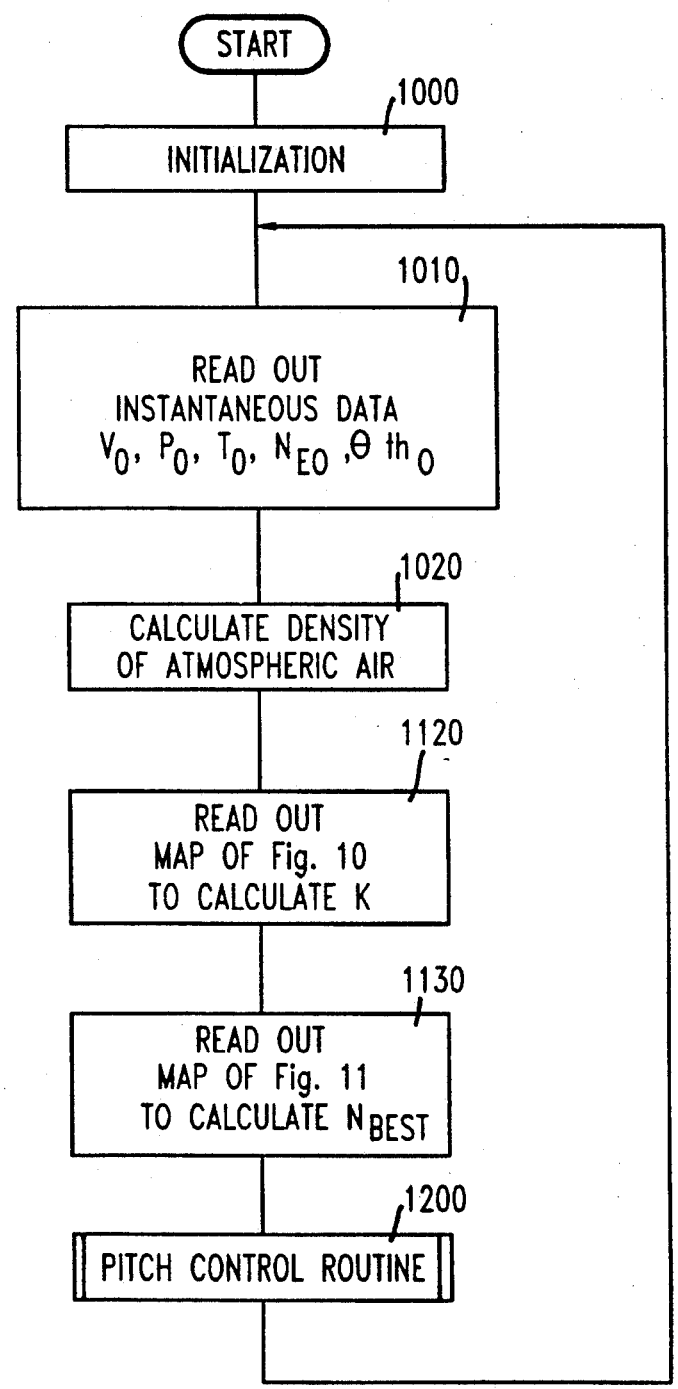
FIG. 9 is a flow chart illustrating another modification of the main routine shown in FIGS. 3(a) to 3(c)
Figures 10, 11:
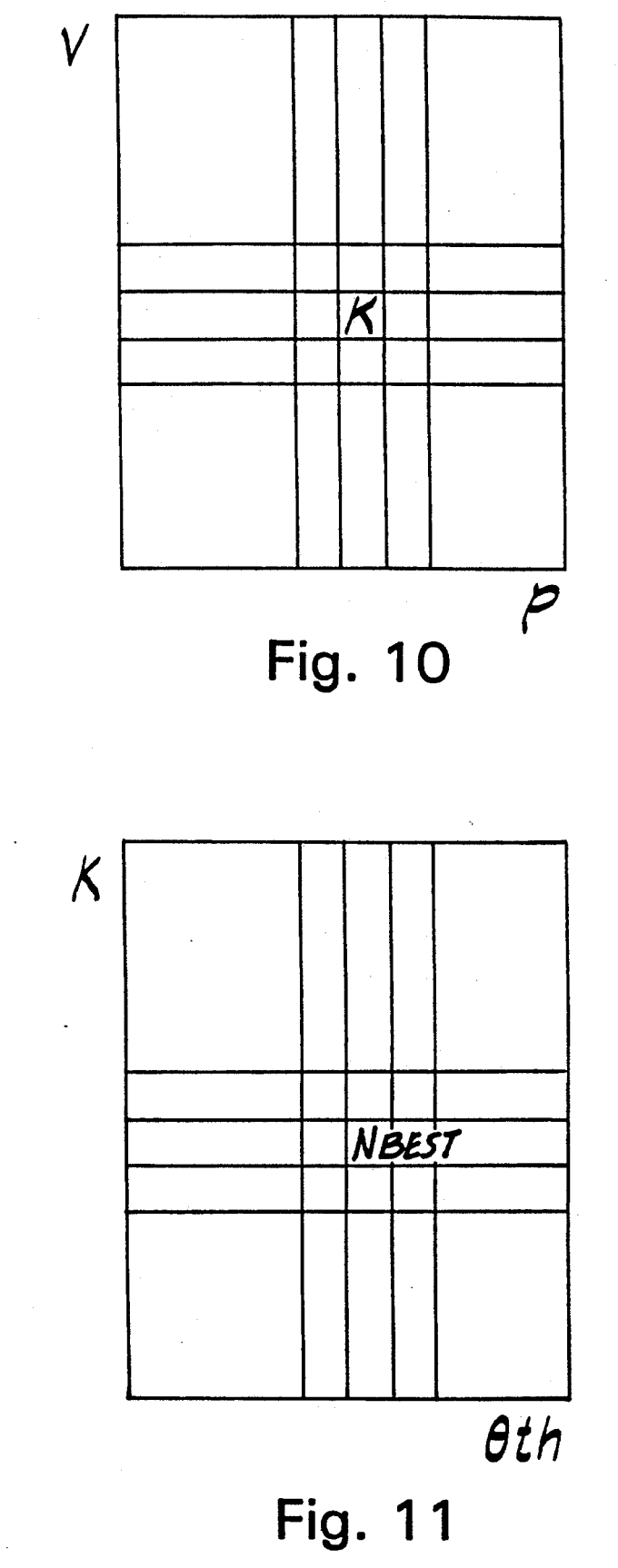

In another modification, the three dimensional map may be replaced with a set of two dimensional maps shown in FIGS. 10 and 11. In this modification, the ROM of computer 36 is arranged to store a modified main routine shown by a flow chart in FIG. 9 and the two dimensional maps shown in FIGS. 10 and 11. The two dimensional map of FIG. 10 is designed to calculate a reference value K on a basis of a relationship between the flight speed V and the density $\rho$ of atmospheric air, while the two dimensional map of FIG. 11 is designed to calculate an optimum rotation number $N_{BEST}$ on a basis of a relationship between the reference value K and the opening degree $\theta$th of the engine throttle for maximizing the thrust force acting on the aircraft. During execution of the program shown in FIG. 9, instantaneous data $V_0$, $P_0$, $N_{E0}$, $\theta_{th0}$ detected by sensors 31-35 are read out at step 1010 after initialization of the variables at step 1000. Subsequently, the density $\rho_0$ of atmospheric air is calculated on a basis of the instantaneous data $P_0$, $T_0$ at step 1020. At the following step 1120, the CPU of computer 36 reads out the two dimensional map of FIG. 10 to calculate a reference value K in dependence upon the instantaneous flight speed $V_0$ and the density $\rho_0$ of atmospheric air and reads out the two dimensional map of FIG. 11 at step 1130 to calculate an optimum rotation number $N_{BEST}$ in relation to the reference value $K_0$ and the instantaneous opening degree $\theta_{th0}$ of the engine throttle. thereafter, the CPU of computer 36 executes the pitch control routine of FIG. 4 at step 1200 to render the instantaneous rotation number of the engine substantially equal to the optimum rotation number $N_{BEST}$. With use of the two dimensional maps shown in FIGS. 10 and 11, the memory capacity of the ROM can be reduced.

Figure 12A:
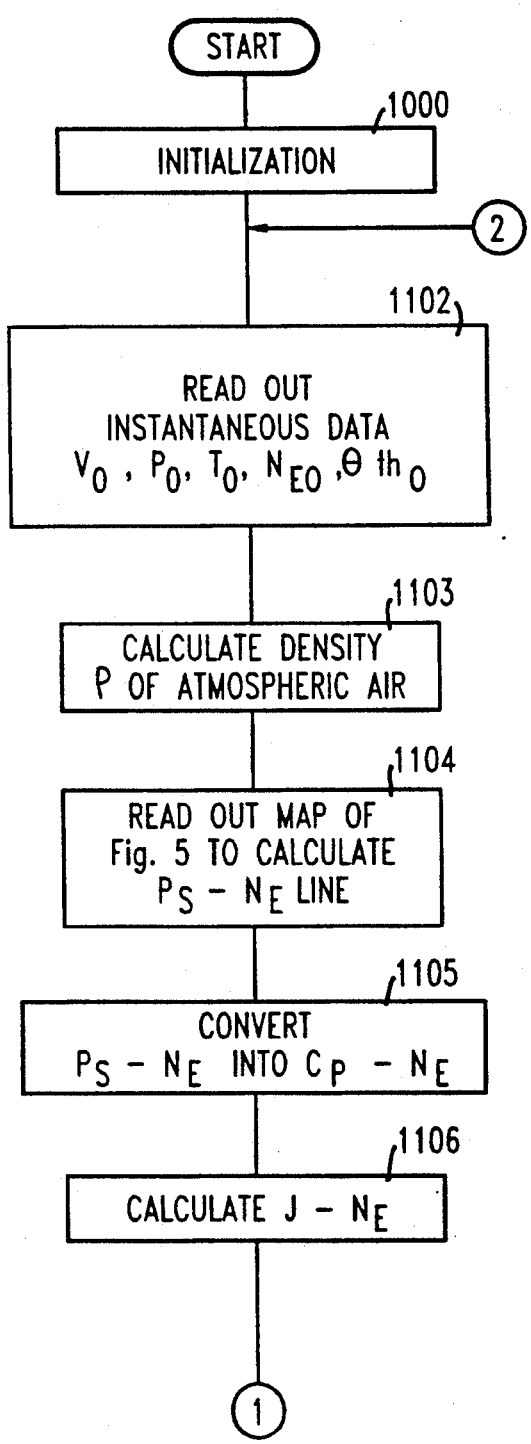
FIGS. 12(a) and 12(b) illustrate another modification of the main routine shown in FIGS. 3(a) to 3(c)
Figure 12B:
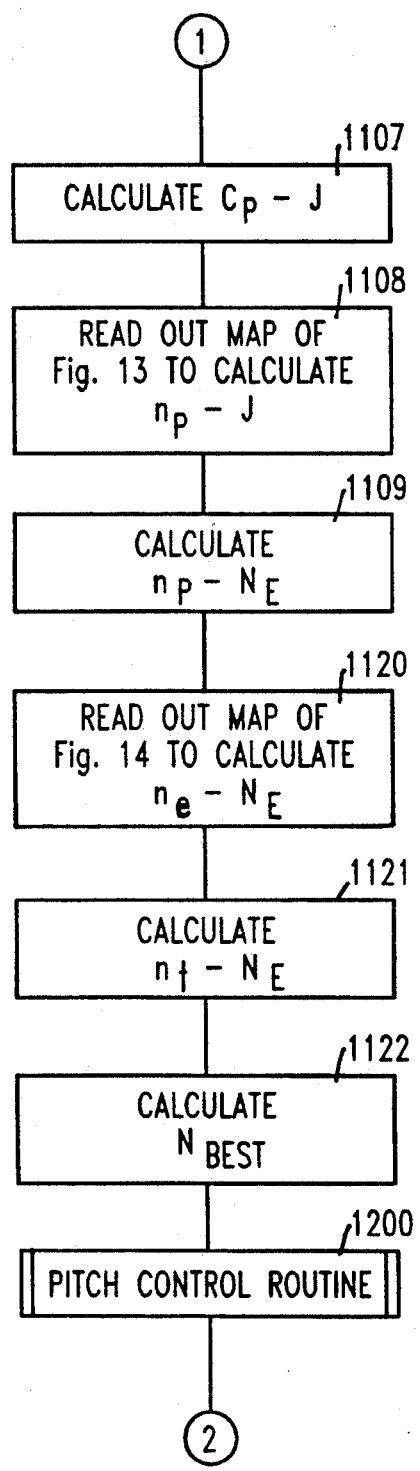
Figure 13:
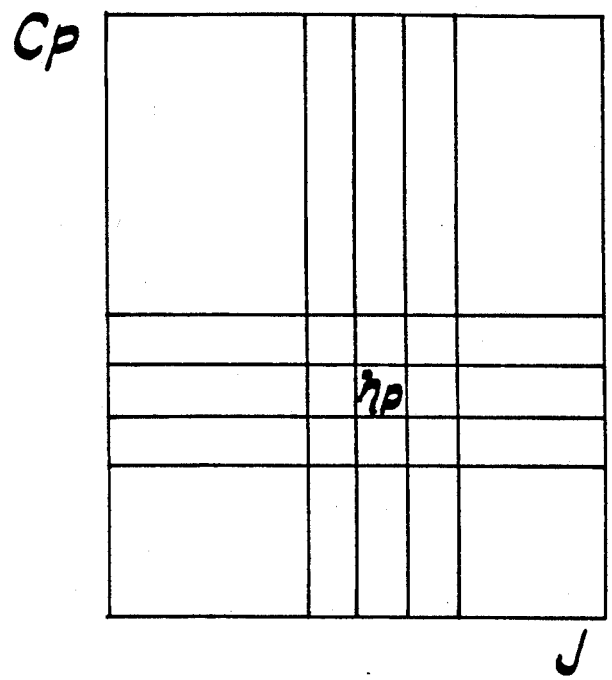
FIG. 13 is a two dimensional map for calculating a propeller efficiency in relation to an advance ratio and a power coefficient.
Figure 14:
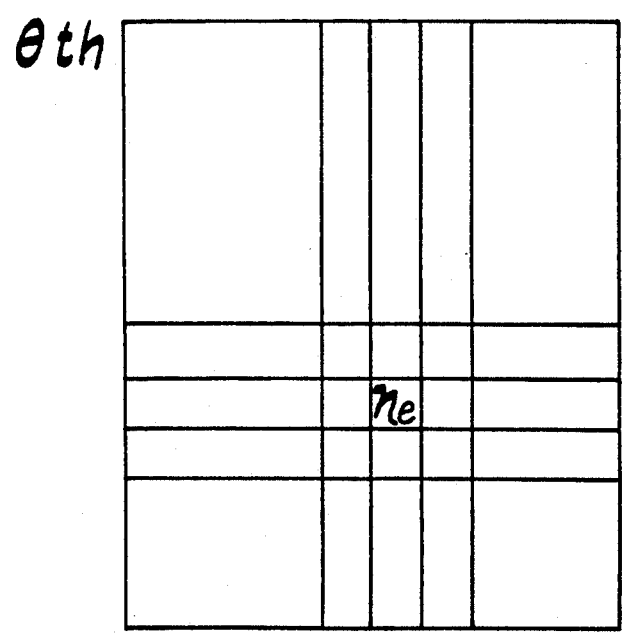
FIG. 14 is a two dimensional map for calculating an operational efficiency of the engine in relation to a rotation number of the engine and an opening degree of the engine throttle.

The main routine of the computer program shown in FIGS. 3(a) to 3(c) may be modified as shown by a flow chart in FIGS. 12(a) and 12(b). For execution of the modified main routine, the ROM of computer 36 is arranged to store the two dimensional map shown in FIG. 5 and two dimensional maps shown in FIGS. 13 and 14. The map of FIG. 5 is desinged to calculate an output power $P_s$ of the engine on a basis of a relationship between the rotation number $N_E$ of the engine and the opening degree $\theta$th of the engine throttle. The map of FIG. 13 is designed to calculate a propeller efficiency $\eta$ on a basis of a relationship between the advance ratio J and the power coefficient Cp. The map of FIG. 14 is designed to calculate an operational efficiency $\eta e$ of the engine on a basis of a relationship between the rotation number $N_E$ of the engine and the opening degree $\theta$th of the engine throttle.

During execution of the modified main routine shown in FIGS. 12(a) and 12(b), instantaneous data $V_0$, $P_0$, $T_0$, $N_{E0}$, $\theta th_0$ are detected by the sensors 31–35 and read out by the CPU of computer 36 at step 1102 after initialization of the variables at step 1000. Subsequently, the CPU of computer 36 calculates the density $\rho_0$ of atmospheric air at step 1103 on a basis of the instantaneous atmospheric pressure $P_0$ and temperature $T_0$. At the following step 1104, the CPU of computer 36 reads out the map of FIG. 5 to calculate a $P_s$-$N_E$ line indicative of a relationship between the output power Ps and the rotation number $N_E$ of the engine in dependence upon the instantaneous opening degree $\theta th_0$ of the engine throttle. When the program proceeds to step 1105, the CPU of computer 36 calculates the following equations to convert the $P_s$-$N_E$ line into a Cp-$N_E$ line indicative of a relationship between the power coefficient Cp and the rotation number $N_E$ of the engine.

$$P_s = \rho_0 \cdot Cp \cdot Np^3 \cdot D^5 \quad (1a)$$

$$Np = K \cdot N_E \quad (1b)$$

where Np is a rotation number of the propeller, K is a constant, and D is the diameter of the propeller.

Subsequently, the CPU of computer 36 calculates the following equation at step 1106 to read out a J-$N_E$ line indicative of a relationship between the advance ratio J and the rotation number $N_E$ of the engine in dependence upon the calculation of the above equation (1b).

$$J = V/Np \cdot D$$

At the following step 1107, the CPU of computer 36 calculates a Cp-J line indicative of a relationship between the power coefficient Cp and the advance ratio J on a basis of the Cp-$N_E$ line and J-$N_E$ line and reads out the map of FIG. 13 at step 1108 to calculate a $\eta p$-J line indicative of a relationship between the propeller efficiency $\eta p$ and the advance ratio J on a basis of the Cp-J line. At step 1109 of the program, the CPU of computer 36 calculates a $\eta p$-$N_E$ line indicative of a relationship between the propeller efficiency $\eta p$ and the rotation number $N_E$ of the engine on a basis of the $\eta p$-J line and J-$N_E$ line. In this case, the propeller efficiency $\eta p$ and a thrust force T produced by the propeller are represented by the following equations.

$$\eta p = V \cdot T/P_s = J \cdot Ct/Cp$$

$$T = \rho_0 \cdot Ct \cdot Np^2 \cdot D^4$$

where Ct is a thrust coefficient.

Subsequently, the CPU of computer 36 reads out the map of FIG. 14 at step 1120 to calculate a $\eta e$-$N_E$ line indicative of a relationship between the operational efficiency $\eta e$ of the engine and the rotation number $N_E$ of the engine in dependence upon the opening degree $\theta th_0$ of the engine throttle. At the following step 1121, the CPU of computer 36 calculates a $\eta t$-$N_E$ line indicative of a relationship between a total efficiency $\eta t (\eta e \times \eta p)$ and the rotation number $N_E$ of the engine on a basis of the $\eta p$-$N_E$ line and $\eta e$-$N_E$ line. Finally, the CPU of computer 36 calculates an optimum rotation number $N_{BEST}$ based on the total efficiency $\eta t$ for maximizing the thrust force acting on the aircraft. Thereafter, the CPU of computer 36 executes the pitch control routine of FIG. 4 at step 1200 to render the instantaneous rotation number of the engine substantially equal to the optimum rotation number $N_{BEST}$. With the execution of the modified main routine shown in FIGS. 12(a) and 12(b), the pitch angle of the propeller blade is controlled to maximize the total efficiency or the product of the propeller efficiency $\eta p$ and the operational efficiency $\eta e$ of the engine. This is effective to maximize the thrust force T produced by the propeller and to reduce fuel consumption of the engine.

Figure 16:
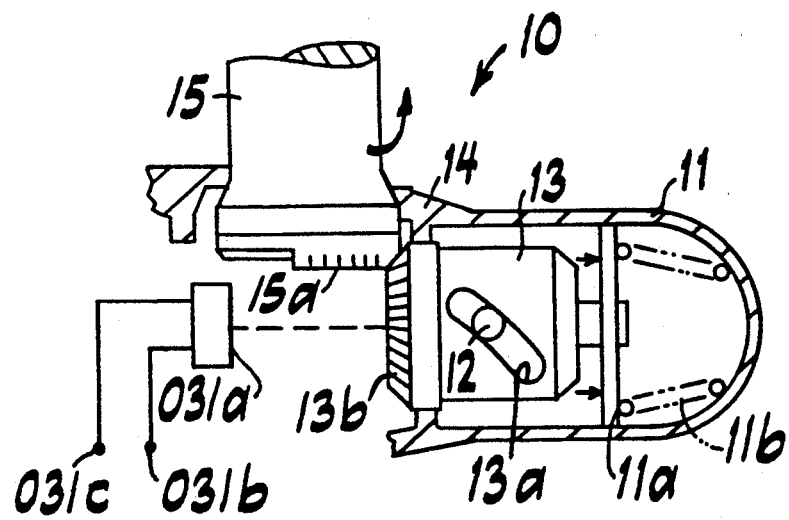
FIG. 16 is a sectional view illustrating a pitch angle sensor mounted to a variable pitch mechanism of the propeller.
Figure 15:
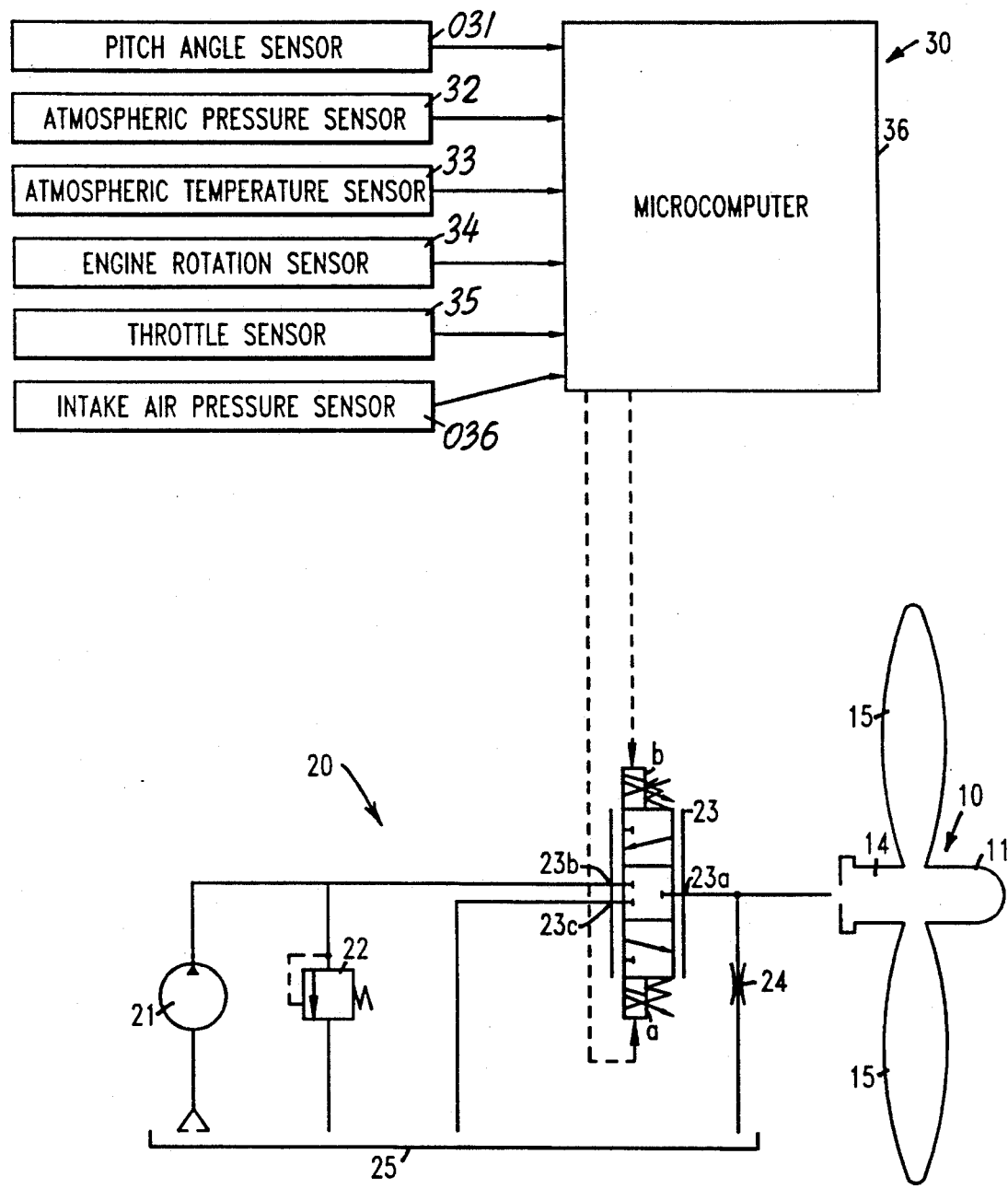
FIG. 15 is a schematic illustration of a modification of the pitch control apparatus shown in FIG. 1.

In FIGS. 15 and 16 there is illustrated a further modification of the pitch control apparatus which includes a pitch angle sensor 031 substituted for the flight speed sensor 31 to detect a pitch angle $\beta$ of the propeller blade and an intake air pressure sensor 036 additionally connected to the interface of computer 36. As shown in FIG. 16, the pitch angle sensor 031 is in the form of a potentiometer 031a operatively connected to the hub member 13 to detect a rotation angle of hub member 13. The output terminals 031b and 031c of potentiometer 031a are connected to a slip ring (not shown) to issue an electric signal indicative of an instantaneous pitch angle $\beta$ of the propeller blade. The intake air pressure sensor 036 is arranged to detect the pressure in an air intake pipe of the aircraft engine for producing an electric signal indicative of the detected intake air pressure $P_{B0}$. In this modification, the ROM of computer 36 is arranged to store a two dimensional map shown in FIG. 18, the three dimensional map of FIG. 8, and a two dimensional map (not shown) indicative of an output power $P_s$ of the engine in relation to the rotation number $N_E$ of the engine and the intake air pressure $P_B$. The ROM of computer 36 is further arranged to store a modified main routine shown by a flow chart in FIGS. 17(a) and 17(b).

Figure 17A:
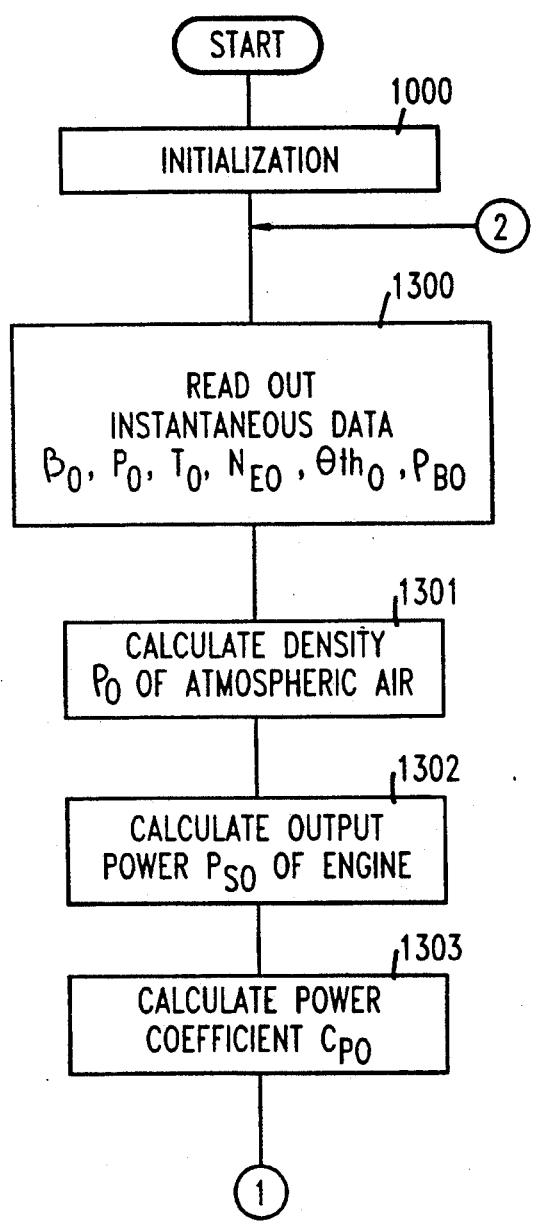
FIGS. 17(a) and 17(b) illustrate a flow chart of a further modification of the main routine shown in FIGS. 3(a) to 3(c)
Figure 17B:
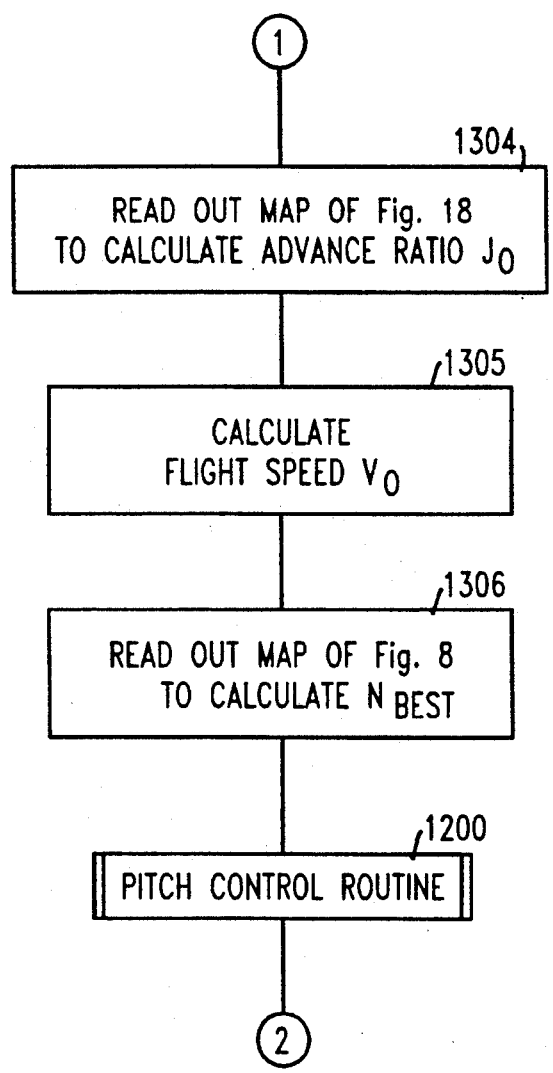

Assuming that the aircraft engine has been started, the computer 36 is activated to initiate execution of the modified main routine shown by the flow chart in FIGS. 17(a) and 17(b). At step 1000 of the program, the CPU of computer 36 initializes variables for execution of the modified main routine and causes the program to proceed to step 1300. At step 1300, the CPU of computer 36 reads out instantaneous data $\beta_0$, $P_0$, $T_0$, $N_{E0}$, $\theta th_0$, $P_{B0}$ detected by sensors 031, 32–35, 036 and stores temporarily the data in the RAM of computer 36. At the following step 1301, the CPU of computer 36 calculates the density $\rho_0$ of atmospheric air based on the instantaneous atmospheric pressure $P_0$ and temperature $T_0$ and reads out the stored two dimensional map at step 1302 to calculate an output power $P_{s0}$ of the engine on a basis of the instantaneous rotation number $N_{E0}$ of the engine and the intake air pressure $P_{B0}$. Subsequently, at step 1303 the CPU of computer 36 calculates an instantaneous power coefficient $C_{p0}$ on a basis of the output power $P_{s0}$ of the engine, the density $\rho_0$ of atmospheric air and the rotation number $NE_0$ of the engine. In this instance, the power coefficient $C_{p0}$ is calculated by the following equations.

$$Cp = P_s/(\rho \cdot Np^3 \cdot D^5) \quad (2a)$$

where Cp is a power coefficient of the propeller, Np is a rotation number of the propeller and D is the diameter of the propeller.

$$N_p = k N_E \quad (2b)$$

$$C_{p0} = f(P, \rho, N_E) \quad (2c)$$

Figure 18:
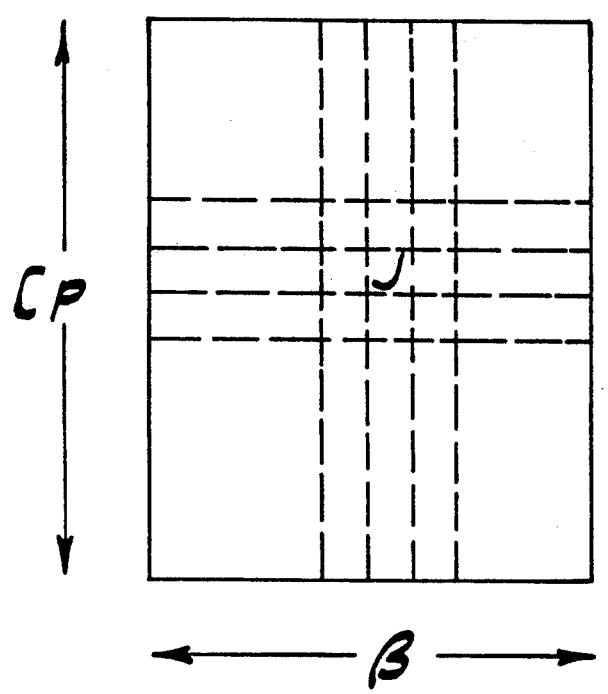
FIG. 18 is a two dimensional map for calculating an advance ratio in relation to a pitch angle of the propeller blade and a power coefficient.

At the following step 1304, the CPU of computer 36 reads out the two dimensional map of FIG. 18 to calculate an instantaneous advance ratio $J_0$ in relation to the power coefficient $C_{p0}$ and the pitch angle $\beta_0$ of the propeller blade. When the program proceeds to step 1305, the CPU of computer 36 calculates an instantaneous flight speed $V_0$ of the aircraft on a basis of the advance ratio $J_0$ and the rotation number $NE_0$ of the engine. In this instance, the instantaneous flight speed $V_0$ is calculated by the above equation (2b) and the following equation.

$$V = J \cdot N_p \cdot D \quad (2d)$$

Figure 8:
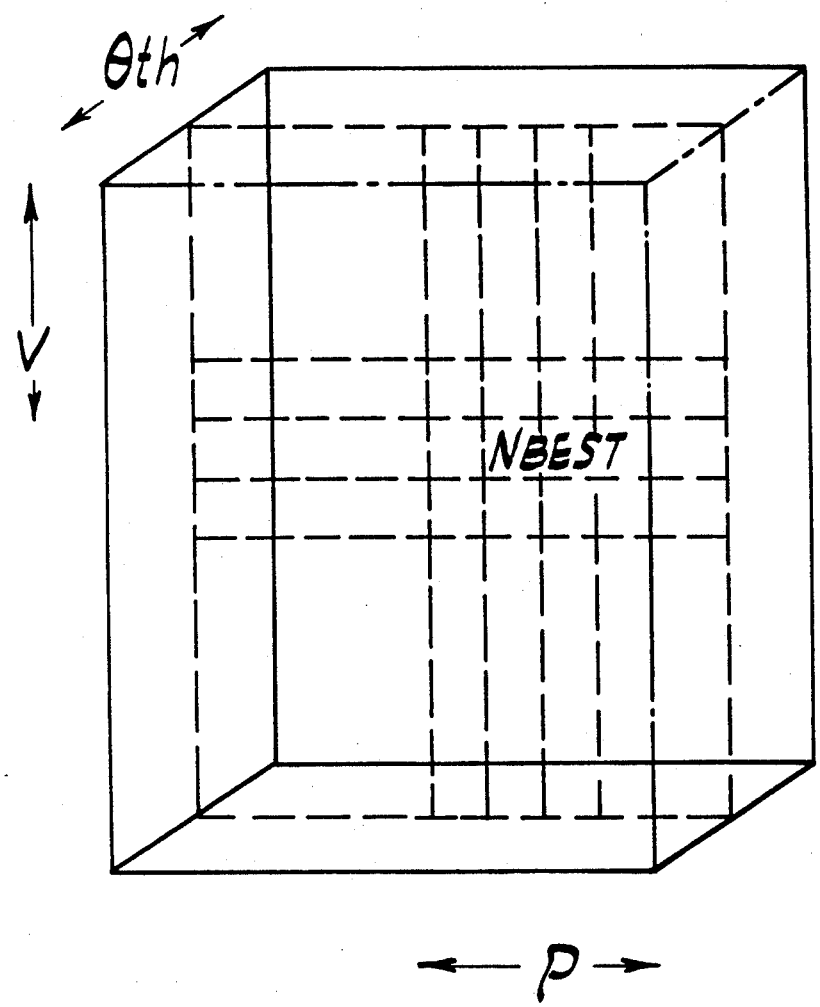
FIG. 8 is a three dimensional map for calculating an optimum rotation number of the engine in relation to a flight speed of the aircraft, an opening degree of the engine throttle and the density of atmospheric air.

Finally, the CPU of computer 36 reads out the three dimensional map of FIG. 8 at step 1306 to calculate an optimum rotation number $N_{BEST}$ of the engine in relation to the flight speed $V_0$, the density $\rho 0$ of atmospheric air and the opening degree $\theta th_0$ of the engine throttle. Thereafter, the CPU of computer 36 executes the pitch control routine of FIG. 4 at step 1200 to render the intantaneous rotation number of the engine substantially equal to the optimum rotation number $N_{BEST}$ for maximizing the thrust acting on the aircraft.

Figure 19:
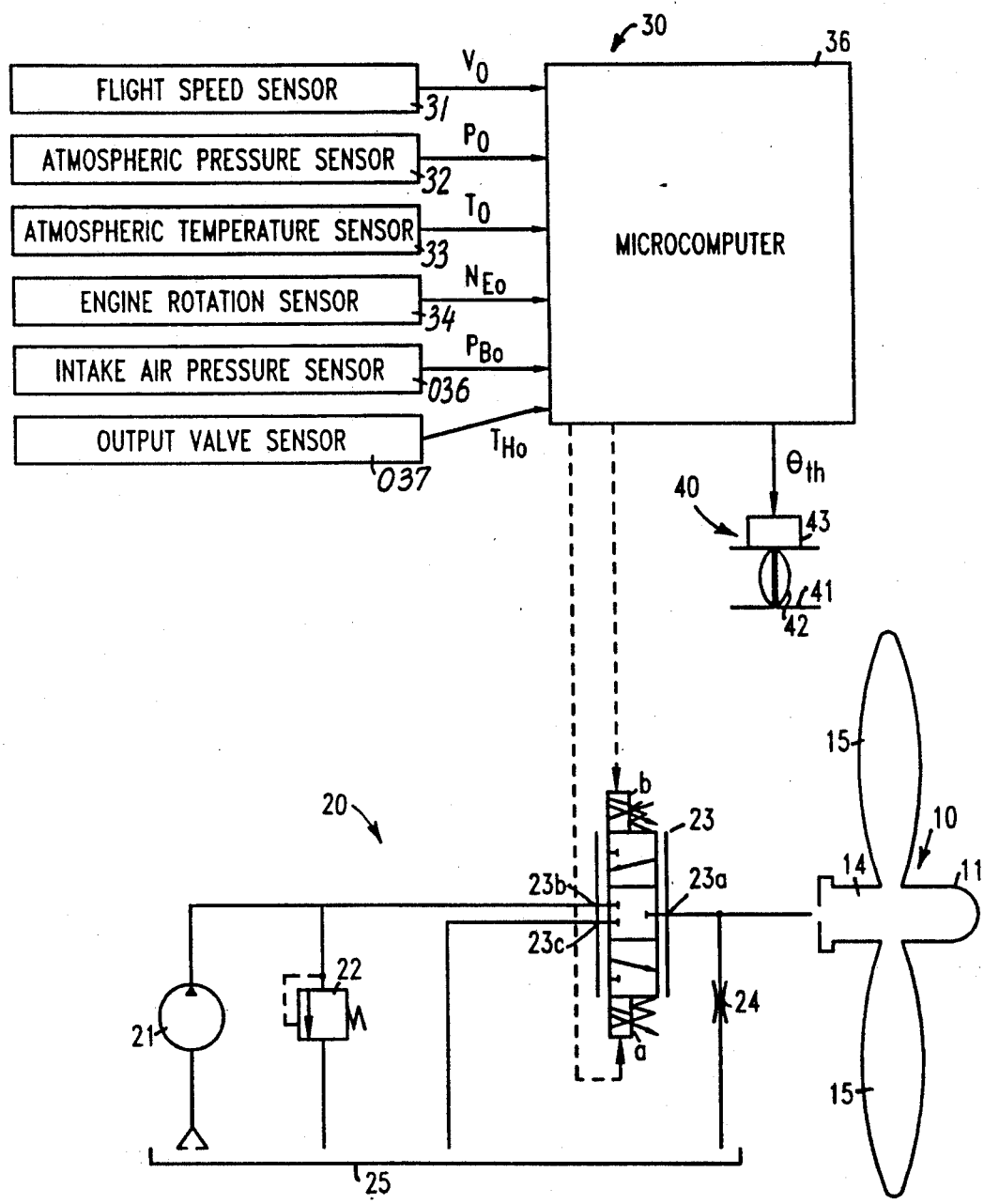
FIG. 19 is a schematic illustration of another modification of the pitch control apparatus shown in FIG. 1.
Figure 21:
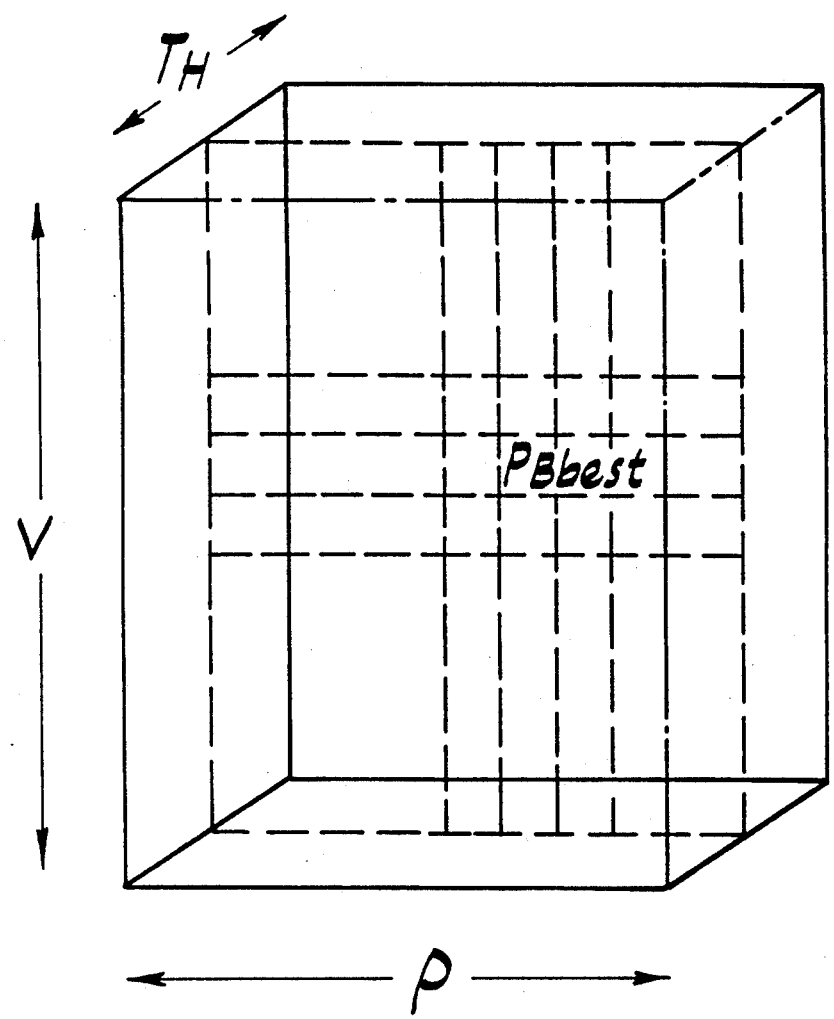
FIG. 21 is a two dimensional map for calculating an optimum intake air pressure in relation to a flight speed of the aircraft, the density of atmospheric air and an output value set by the pilot.
Figure 22:
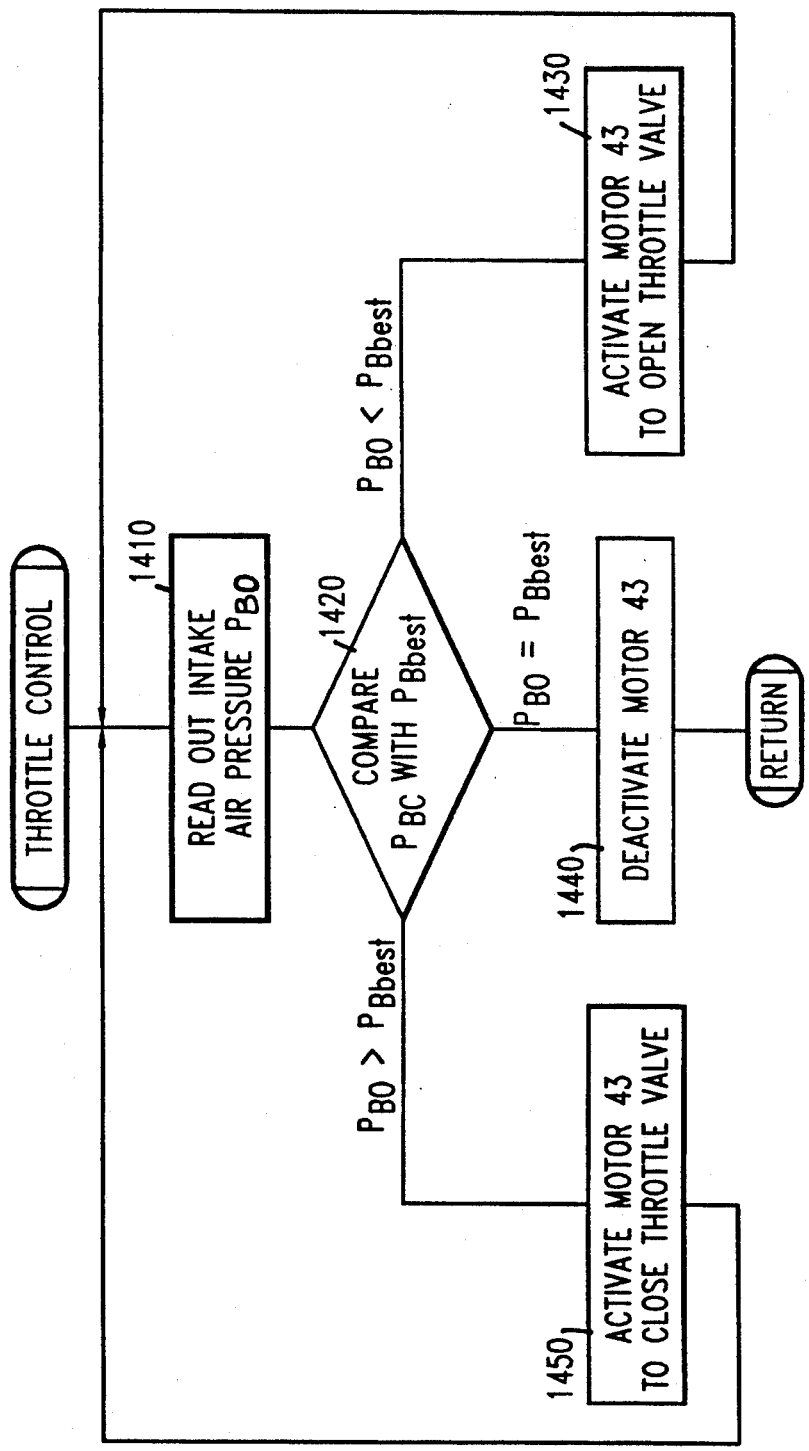
FIG. 22 is a flow chart illustrating a throttle control routine to be processed by the computer.
Figure 23:
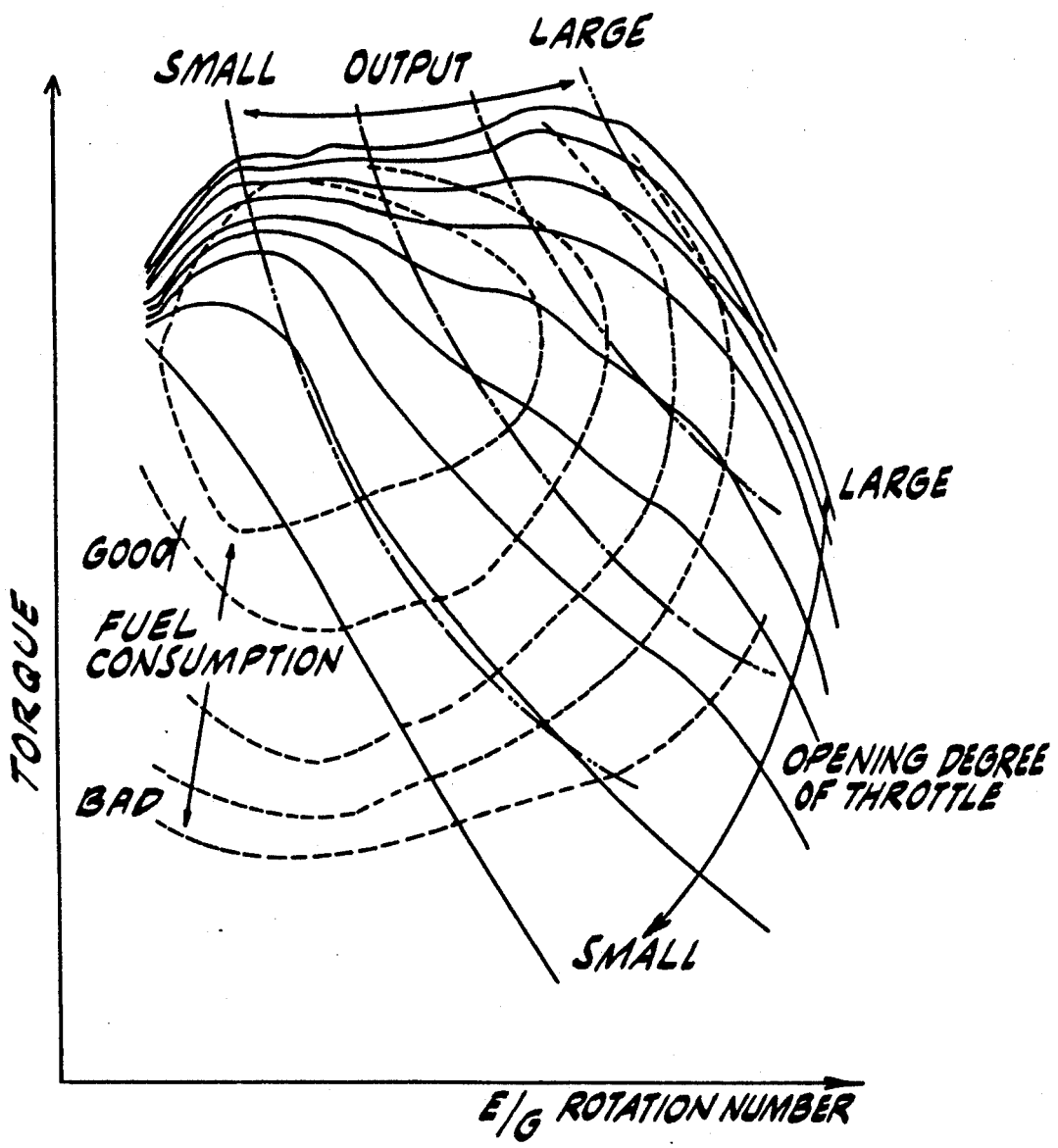
FIG. 23 is a graph illustrating the characteristic of the aircraft engine.

In FIG. 19 there is illustrated a still further modification of the pitch control apparatus which includes an intake air pressure sensor 036 substituted for the throttle sensor 35, an output value sensor 037 additionally connected to the interface of computer 36, and a throttle control mechanism 40 arranged to be operated under control of the computer 36. The intake air pressure sensor 036 is arranged to detect the pressure in an air intake pipe of the aircraft engine for producing an electric signal indicative of the detected intake air pressure $P_{B0}$. The output value sensor 037 is in the form of a potentiometer operatively connected to a manual lever (not shown) arranged to be operated by the pilot from the cockpit for setting an output value $T_{H0}$. Thus, the output value sensor 037 produces an electric signal indicative of the output value $T_{H0}$ set by the pilot. In this modification, the ROM of computer 36 is arranged to store a modified main routine shown by a flow chart in FIG. 20, a throttle control routine shown by a flow chart in FIG. 22 and the pitch control routine shown by the flow chart in FIG. 4. For execution of the modified main routine, the ROM of computer 36 is further arranged to store a three dimensional map shown in FIG. 21 and the three dimensional map shown in FIG. 8. The three dimensional map of FIG. 21 is designed to calculate an optimum intake air pressure $P_{Bbest}$ for most economical fuel consumption in relation to the flight speed V of the aircraft, the density $\rho$ of atmospheric air and the outout value $T_H$ set by the pilot. In this case, the three dimensional map of FIG. 8 is arranged to calculate an optimum rotation number $N_{BEST}$ for most economical fuel consumption in relation to the flight speed V of the aircraft and the output value $T_H$ set by the pilot. The data of the three dimensional maps are memorized as data theoretically confirmed in consideration with the engine characteristic shown in FIG. 23.

Figure 24:
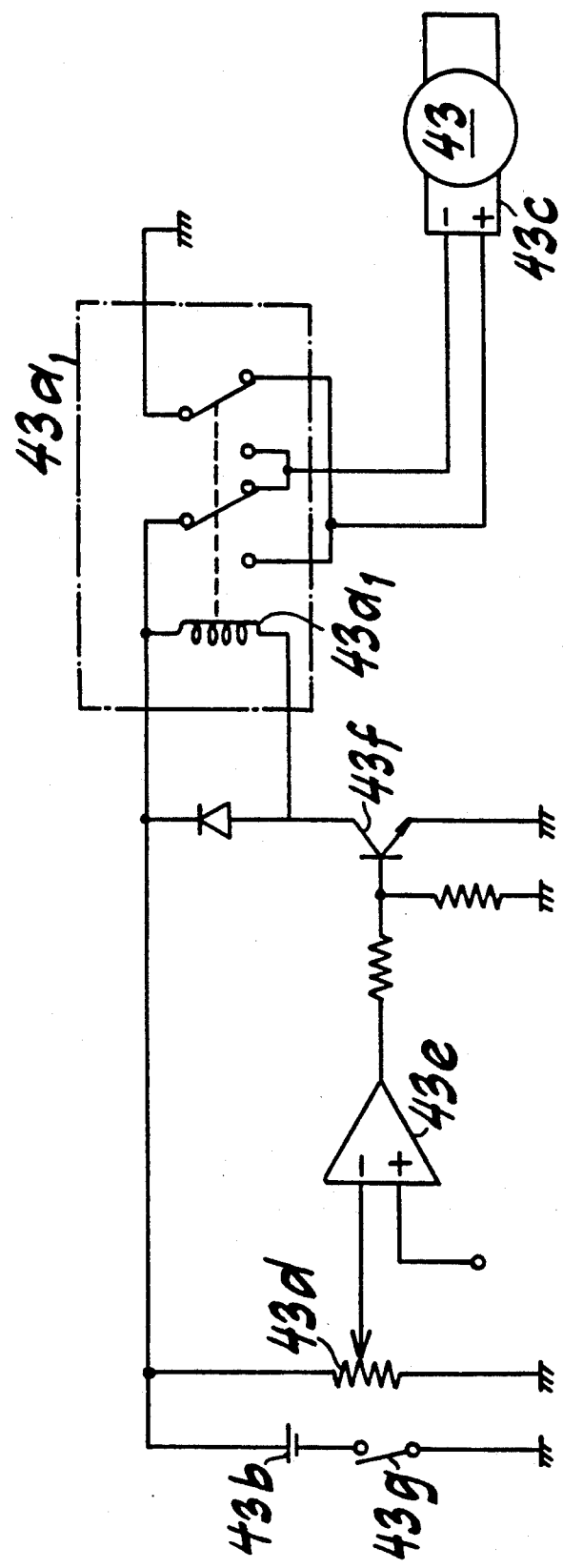
FIG. 24 is a diagram of a control circuit for an electric motor shown in FIG. 19.

As shown in FIG. 19, the throttle control mechanism 40 includes an electric motor 43 arranged to drive a throttle valve 42 in an air intake pipe 41 of the aircraft engine. The electric motor 43 is activated by a throttle control signal $\theta th$ applied thereto from the computer 36 to control an opening degree of the throttle valve 42. As shown in FIG. 24, the electric motor 43 is connected at its input terminals 43c to an electric power source 43b through a relay switch 43a, and a source switch 43g is arranged to be operated under control of the computer 36. The electromagnetic coil $43a_1$ of relay switch 43a is arranged to be energized under control of a switching transistor 43f which is connected at its base to a comparator 43e. The comparator 43e is connected at its negative terminal to a resistor 43d for generation of a reference voltage Vref and at its positive terminal to the computer 36 to be applied with the throttle control signal $\theta th$ therefrom. When the voltage value of the throttle control signal $\theta th$ becomes higher than the reference voltage Vref, the transistor 43f is turned on to energize the electromagnetic coil $43a_1$, and in turn, the relay switch 43a is switched over to rotate the electric motor 43 in a forward direction thereby to open the throttle valve 42. When the voltage value of the throttle control signal $\theta th$ becomes lower than the reference voltage Vref, the transistor 43f is turned off to deenergize the electromagnetic coil $43a_1$, and in turn, the relay switch 43a is switched over to rotate the electric motor 43 in a reverse direction thereby to close the throttle valve 42.

Figure 20:
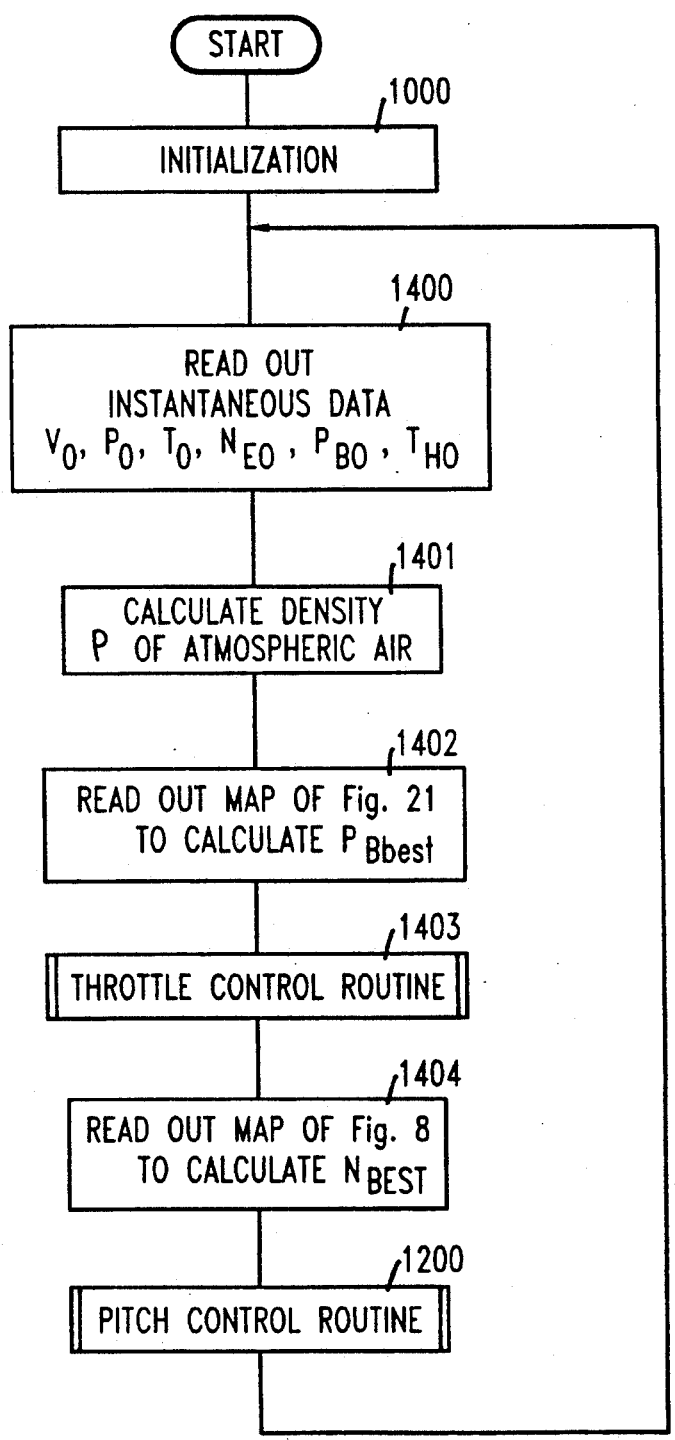
FIG. 20 is a flow chart illustrating a modification of the main routine shown in FIGS. 3(a) to 3(c)

Assuming that the aircraft engine has been started, the computer 36 is activated to initiate execution of the modified main routine shown by the flow chart in FIG. 20. At step 1000 of the program, the CPU of computer 36 initializes variables for execution of the modified main routine and causes the program to proceed to step 1400. At step 1400, the CPU of computer 36 reads out instantaneous data $V_0$, $P_0$, $T_0$, $N_{E0}$, $P_{B0}$, $T_{H0}$ detected by sensors 31-34, 036, 037 and stores temporarily the data in the RAM of computer 36. At the following step 1401, the CPU of computer 36 calculates the density $\rho_0$ of atmospheric air based on the instantaneous atmospheric pressure $P_0$ and temperature $T_0$ and reads out the three dimensional map of FIG. 21 at step 1402 to calculate an optimum intake air pressure $P_{Bbest}$ in relation to the instantaneous fligh speed $V_0$, the density $\rho_0$ of atmospheric air and the output value $T_{H0}$.

Subsequently, the CPU of computer 36 initiates execution of the throttle control routine at step 1403 of the program. At step 1410 of the throttle control routine, the CPU of computer 36 reads out the intantaneous intake air pressure $P_{B0}$ to compare with the optimum intake air pressure $P_{Bbest}$ at step 1420. When the instantaneous intake air pressure $P_{B0}$ is lower than the optimum intake air pressure $P_{Bbest}$, the program proceeds to step 1430 where the CPU of computer 36 issues a throttle control signal $\theta th$ at a higher level than the reference voltage Vref. As a result, the electric motor 43 rotates in the forward direction under control of the relay switch 43a shown in FIG. 24 to increase an opening degree of the throttle valve 42. Thus, the intake air pressure $P_{B0}$ increases in accordance with an increase of the opening degree of the throttle valve 42. While the intake air pressure $P_{B0}$ is still lower than the optimum intake air pressure $P_{Bbest}$, the CPU of computer 36 will repeat the execution at step 1410, 1420 and 1430 to render the instantaneous intake air pressure $P_{B0}$ substantially equal to the optimum intake air pressure $P_{Bbest}$.

When the instantaneous intake air pressure $P_{B0}$ becomes equal to the optimum intake air pressure $P_{Bbest}$, the CPU of computer 36 causes the program at step 1420 to proceed to step 1440. At step 1440, the source switch 43g of FIG. 24 is opened by an electric control signal applied thereto from the computer 36 so that the electric motor 43 is deactivated to retain the throttle valve 42 in its open position. Subsequently, the CPU of computer 36 causes the program to proceed to step 1404 of the main routine.

When the instantaneous intake air pressure $P_{B0}$ is higher than the optimum intake air pressure $P_{Bbest}$, the program proceeds to step 1450 where the CPU of computer 36 issues a throttle control signal $\theta$th at a lower level than the reference voltage Vref. As a result, the electric motor 43 rotates in the reverse direction under control of the relay switch 43a shown in FIG. 24 to decrease an opening degree of the throttle valve 42. Thus, the intake air pressure $P_{B0}$ decreases in accordance with a decrease of the opening degree of the throttle valve 42. While the intake air pressure $P_{B0}$ is still higher than the optimum intake air pressure $P_{Bbest}$, the CPU of computer 36 will repeat the execution at step 1410, 1420 and 1450 to render the instantaneous intake air pressure $P_{B0}$ substantially equal to the optimum intake air pressure $P_{Bbest}$. When the instantaneous intake air pressure $P_{B0}$ becomes equal to the optimum intake air pressure $P_{Bbest}$, the CPU of computer 36 causes the program at step 1420 to proceed to step 1440. At step 1440, the source switch 43g of FIG. 24 is opened by an electric control signal applied thereto from the computer 36 so that the electric motor 43 is deactivated to retain the throttle valve 42 in its open position. Subsequently, the CPU of computer 36 causes the program to proceed to step 1404 of the main routine.

At step 1404 of the main rountine, the CPU of computer 36 reads out the three dimensional map of FIG. 8 to calculate an optimum rotation number $N_{BEST}$ in relation to the instantaneous flight speed $V_0$, the density $\rho_0$ of atmospheric air and the output value $T_{H0}$. Thereafter, the CPU of computer 36 executes the pitch control routine of FIG. 4 at step 1200 to render the instantaneous rotation number of the engine substantially equal to the optimum rotation number $N_{BEST}$ for maximizing the thrust force acting on the aircraft.

Having now fully set forth both structure and operation of preferred embodiments of the concept underlying the present invention, various other embodiments as well as certain modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A pitch control apparatus for a variable pitch propeller in drive connection to an engine of an aircraft, comprising:

a flight speed sensor for detecting a flight speed of the aircraft and for producing a first electric signal indicative of the detected flight speed;

a throttle sensor for detecting an opening degree of a throttle of the engine and for producing a second electronic signal indicative of the detected opening degree of the engine throttle;

an engine rotation sensor for detecting a rotation number of the engine and for producing a third electric signal indicative of the detected rotation number of the engine;

means for detecting the density of atmospheric air in flight of the aircraft;

means responsive to said first and second electric signal for calculating an optimum rotation number of the engine in relation to the flight speed, the opening degree of the engine throttle and the density of atmospheric air for maximizing a thrust force acting on the aircraft; and means responsive to said third electric signal for controlling a pitch angle of a propeller blade in such a manner that the rotation number of the engine becomes substantially equal to the calculated optimum rotation number.

2. A pitch control apparatus as claimed in claim 1, said means for detecting the density of atmospheric air comprises an atmospheric pressure sensor for detecting the atmospheric pressure in flight of the aircraft, an atmospheric temperature sensor for detecting the atmospheric temperature in flight of the aircraft, and means for calculating the density of atmospheric air based on the detected atmospheric pressure and temperature.

3. A pitch control apparatus for a variable pitch propeller in drive connection to an engine of an aircraft comprising:

a flight speed sensor for detecting a flight speed of the aircraft and for producing a first electric signal indicative of the detected flight speed;

a throttle sensor for detecting an opening degree of a throttle of the engine and for producing a second electric signal indicative of the detected opening degree of the engine throttle;

an engine rotation sensor for detecting a rotation number of the engine and for producing a third electric signal indicative of the detected rotation number of the engine;

means for detecting the density of atmospheric air in flight of the aircraft;

means responsive to said first electric signal for calculating a reference value on a basis of a relationship between the flight speed and the density of atmospheric air;

means responsive to said second electric signal for calculating an optimum rotation number of the engine on a basis of a relationship between the reference value and the opening degree of the engine throttle for maximizing a thrust force acting on the aircraft; and means responsive to said third electric signal for controlling a pitch angle of a propeller blade in such a manner that the rotation number of the engine becomes substantially equal to the calculated optimum rotation number.

4. A pitch control apparatus for a variable pitch propeller in drive connection to an engine of an aircraft, comprising:

a throttle sensor for detecting an opening degree of a throttle of the engine and for producing a first electric signal indicative of the detected opening degree of the engine throttle;

an engine rotation sensor for detecting a rotation number of the engine and for producing a second electric signal indicative of the detected rotation number of the engine;

means for calculating a propeller efficiency on a basis of a relationship between an advance ratio and a power coefficient;

means responsive to said first and second electric signals for calculating an operational efficiency of the engine on a basis of a relationship between the opening degree of the engine throttle and the rotation number of the engine;

means for calculating a product of the propeller efficiency and the operational efficiency of the engine;

means for calculating an optimum rotation number of the engine for maximizing the product of the propeller efficiency and the operational efficiency of the engine; and means responsive to said second electric signal for controlling a pitch angle of a propeller blade in such a manner that the rotation number of the engine becomes substantially equal to the calculated optimum rotation number.

5. A pitch control apparatus for a variable pitch propeller in drive connection to an engine of an aircraft comprising:

a pitch angle sensor for detecting a pitch angle of a propeller blade and for producing a first electric signal indicative of the detected pitch angle;

an engine rotation sensor for detecting a rotation number of the engine and for producing a second electric signal indicative of the detected rotation number of the engine;

a throttle sensor for detecting an opening degree of a throttle of the engine and for producing a third electric signal indicative of the detected opening degree of the engine throttle;

means for detecting the density of atmospheric air;

means for detecting an output power of the engine;

means responsive to said first and second electric signals for calculating a flight speed of the aircraft on a basis of a relationship among the pitch angle, the rotation number of the engine, the density of atmospheric air and the output power of the engine;

means responsive to said third electric signal for calculating an optimum rotation number of the engine in relation to the flight speed, the density of atmospheric air and the opening degree of the throttle; and means responsive to said second electric signal for controlling a pitch angle of the propeller blade in such a manner that the rotation number of the engine becomes substantially equal to the optimum rotation number.

* * * * *